(12) United States Patent
Dudda et al.

(10) Patent No.: US 11,005,704 B2
(45) Date of Patent: *May 11, 2021

(54) MOBILITY ROBUSTNESS IN A CELLULAR NETWORK

(71) Applicant: Telefonaktiebolaget LM Ericsson (publ), Stockholm (SE)

(72) Inventors: Torsten Dudda, Aachen (DE); Angelo Centonza, Stockholm (SE); Mats Folke, Vällingby (SE); Stefan Wager, Espoo (FI); Emre Yavuz, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/704,221

(22) Filed: Dec. 5, 2019

(65) Prior Publication Data
US 2020/0119977 A1 Apr. 16, 2020

Related U.S. Application Data

(63) Continuation of application No. 14/414,512, filed as application No. PCT/EP2015/050271 on Jan. 8, 2015, now Pat. No. 10,530,639.
(Continued)

(51) Int. Cl.
*H04L 12/24* (2006.01)
*H04W 36/00* (2009.01)
(Continued)

(52) U.S. Cl.
CPC ......... *H04L 41/0672* (2013.01); *H04W 24/02* (2013.01); *H04W 24/10* (2013.01);
(Continued)

(58) Field of Classification Search
CPC .......... H04L 41/0672; H04L 43/0817; H04W 24/02; H04W 24/10; H04W 36/0055;
(Continued)

(56) References Cited

U.S. PATENT DOCUMENTS 8,184,594 B2 5/2012 Li et al.
8,369,286 B2 2/2013 Hamabe et al.
(Continued)

OTHER PUBLICATIONS

Ericsson, "Proposal for addition of T312 cause to RLF Report", 3GPP TSG-RAN WG3 Meeting #83bis R3-14xxxx San Jose Del Cabo, Mexico, Mar. 31, 2014, pp. 1-5, R3-14xxxx, 3GPP.
(Continued)

*Primary Examiner* — Asad M Nawaz
*Assistant Examiner* — Thomas R Cairns
(74) *Attorney, Agent, or Firm* — Coats & Bennett, PLLC

(57) ABSTRACT

A user equipment starts a first timer in response to detecting a physical layer problem with a radio link between the user equipment and a node of a cellular network. Responsive to detecting a handover measurement event, the user equipment also starts a second timer and sends a measurement report to the node. The starting of the first and second timers causes the first and second timers to simultaneously elapse. Responsive to one of the simultaneously elapsing timers expiring, the user equipment sends a radio link failure report, to the node, indicating which of the simultaneously elapsing timers expired.

21 Claims, 11 Drawing Sheets

Related U.S. Application Data

(60) Provisional application No. 61/968,570, filed on Mar. 21, 2014.

(51) Int. Cl.
*H04W 24/02* (2009.01)
*H04W 24/10* (2009.01)
*H04W 76/19* (2018.01)
*H04W 40/36* (2009.01)
*H04W 40/12* (2009.01)
*H04L 12/26* (2006.01)

(52) U.S. Cl.
CPC ... *H04W 36/0055* (2013.01); *H04W 36/0058* (2018.08); *H04L 43/0817* (2013.01); *H04W 40/12* (2013.01); *H04W 40/36* (2013.01); *H04W 76/19* (2018.02)

(58) Field of Classification Search
CPC . H04W 36/0058; H04W 40/12; H04W 40/36; H04W 76/19
See application file for complete search history.

(56) References Cited

U.S. PATENT DOCUMENTS

| | | | |
|---|---|---|---|
| 8,738,004 B2 | 5/2014 | Amirijoo et al. | |
| 8,885,573 B2 | 11/2014 | Pani et al. | |
| 9,130,688 B2 | 9/2015 | Yiu et al. | |
| 9,131,495 B2 | 9/2015 | Teyeb et al. | |
| 9,160,515 B2 | 10/2015 | Yiu et al. | |
| 9,198,093 B2 | 11/2015 | Olofsson et al. | |
| 9,313,702 B2 | 4/2016 | Virtej et al. | |
| 9,532,241 B2 | 12/2016 | Koskinen et al. | |
| 9,554,305 B2 | 1/2017 | Moustafa et al. | |
| 9,992,812 B2 | 6/2018 | Watanabe et al. | |
| 10,362,615 B2* | 7/2019 | Hong | H04W 76/15 |
| 2010/0195507 A1 | 8/2010 | Marinier et al. | |
| 2011/0320857 A1* | 12/2011 | Kwon | H04L 41/0672 |
| | | | 714/2 |
| 2012/0281527 A1* | 11/2012 | Sebire | H04W 76/19 |
| | | | 370/228 |
| 2012/0281548 A1 | 11/2012 | Lin et al. | |
| 2013/0165108 A1 | 6/2013 | Xu et al. | |
| 2013/0182563 A1 | 7/2013 | Johansson et al. | |
| 2013/0260745 A1 | 10/2013 | Johansson et al. | |
| 2014/0038616 A1 | 2/2014 | Burbidge et al. | |
| 2014/0321430 A1 | 10/2014 | Bakker et al. | |
| 2014/0378138 A1 | 12/2014 | Chang et al. | |
| 2015/0038143 A1 | 2/2015 | Kilpatrick, II | |
| 2015/0098448 A1 | 4/2015 | Xu et al. | |
| 2015/0334607 A1 | 11/2015 | Singh et al. | |
| 2015/0351139 A1 | 12/2015 | Zhang et al. | |
| 2016/0007403 A1 | 1/2016 | Futaki et al. | |
| 2016/0014646 A1* | 1/2016 | Yiu | H04W 24/04 |
| | | | 370/331 |
| 2016/0150447 A1 | 5/2016 | Quan et al. | |
| 2016/0269952 A1 | 9/2016 | Moon et al. | |
| 2016/0302127 A1 | 10/2016 | Moon et al. | |

OTHER PUBLICATIONS

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36300 V12.0.0, Dec. 1, 2013, pp. 1-208, 3GPP, France.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.0.0, Dec. 1, 2013, pp. 1-349, 3GPP, France.

Ericsson, "Fast RLF recovery", Change Request, 3GPP TSG-RAN WG2 Meeting #85, Prague, Czech Republic, Jan. 31, 2014, pp. 1-22, R2-140562, 3GPP.

3rd Generation Partnership Project, "3rd Generation Partnership Project; Technical Specification Group Radio Access Network; Evolved Universal Terrestrial Radio Access Network (E-UTRAN); X2 application protocol (X2AP) (Release 12)", 3GPP TS 36.423 V12.0.0, Dec. 1, 2013, pp. 1-144, 3GPP, France.

Huawei, "MRO and TTT scaling", 3GPP TSG-RAN WG3 Meeting #83, Prague, CZ, Feb. 10, 2014, pp. 1-4, R3-140130, 3GPP.

3rd Generation Partnership Project, "3rd Generation Partnership Project; Technical Specification Group Radio Access Network; Evolved Universal Terrestrial Radio Access (E-UTRA); Requirements for support of radio resource management (Release 12)", 3GPP TS 36.133 V12.2.0, Dec. 1, 2013, pp. 1-815, 3GPP, France.

Ericsson, et al., "Introduction of T312", Change Request, 3GPP TSG-RAN WG2 Meeting #85, Prague, Czech Republic, Feb. 21, 2014, pp. 1-15, R2-141023, 3GPP.

Ericsson, et al., "Fast RLF recovery", 3GPP TSG-RAN WG2 Meeting #85, Prague, Czech Republic, Feb. 14, 2014, pp. 1-22, Change Request 1436 for 3GPP TS 36.331, R2-140923, 3GPP.

3rd Generation Partnership Project, "3rd Generation Partnership Project; Technical Specification Group Radio Access Network; Evolved Universal Terrestrial Radio Access Network (E-UTRAN); Self-configuring and self-optimizing network (SON) use cases and solutions (Release 9)", Technical Report, 3GPP TR 36.902 V9.3.1, Mar. 1, 2011, pp. 1-21, 3GPP, France.

Ericsson, "Proposal for addition of T312 cause to RLF Report", 3GPP TSG-RAN WG3 Meeting #83bis, San Jose Del Cabo, Mexico, Mar. 31, 2014, pp. 1-5, R3-140835, 3GPP.

Ericsson, "T312 expiry as RLF cause value in RLF report", 3GPP TSG-RAN WG2 #86, Seoul, South Korea, May 19, 2014, pp. 1-3, Tdoc R2-142344, 3GPP.

* cited by examiner

*VarRLF-Report* UE variable

```
-- ASN1START

VarRLF-Report-r10 ::=           SEQUENCE {
    rlf-Report-r10                  RLF-Report-r9,
    plmn-Identity-r10               PLMN-Identity
}

VarRLF-Report-r11 ::=           SEQUENCE {
    rlf-Report-r10                  RLF-Report-r9,
    plmn-IdentityList-r11           PLMN-IdentityList11[[[[]]p[]
}

-- ASN1STOP

RLF-Report-r9 ::=               SEQUENCE {
    measResultLastServCell-r9       SEQUENCE {
        rsrpResult-r9                   RSRP-Range,
        rsrqResult-r9                   RSRQ-Range              OPTIONAL
    },
    measResultNeighCells-r9         SEQUENCE {
        measResultListEUTRA-r9          MeasResultList2EUTRA-r9     OPTIONAL,
        measResultListUTRA-r9           MeasResultList2UTRA-r9      OPTIONAL,
        measResultListGERAN-r9          MeasResultListGERAN         OPTIONAL,
        measResultsCDMA2000-r9          MeasResultList2CDMA2000-r9  OPTIONAL
    } OPTIONAL,
    ...,
    [[ locationInfo-r10              LocationInfo-r10        OPTIONAL,
       failedPCellId-r10                CHOICE {
           cellGlobalId-r10                 CellGlobalIdEUTRA,
           pci-arfcn-r10                    SEQUENCE {
               physCellId-r10                   PhysCellId,
               carrierFreq-r10                  ARFCN-ValueEUTRA
           }
       }                                                        OPTIONAL,
       reestablishmentCellId-r10        CellGlobalIdEUTRA       OPTIONAL,
       timeConnFailure-r10              INTEGER (0..1023)       OPTIONAL,
       connectionFailureType-r10        ENUMERATED {rlf, hof}   OPTIONAL,
       previousPCellId-r10              CellGlobalIdEUTRA       OPTIONAL
    ]],
    [[ failedPCellId-v1090
           carrierFreq-v1090                ARFCN-ValueEUTRA-v9e0
                                                                OPTIONAL
    ]],
    [[ basicFields-r11               SEQUENCE {
           c-RNTI-r11                       C-RNTI,
           rlf-Cause-r11                    ENUMERATED {
                                                t310-Expiry, randomAccessProblem,
                                                rlc-MaxNumRetx, spare1},
           timeSinceFailure-r11             TimeSinceFailure-r11
       }                                                        OPTIONAL,
       previousUTRA-CellId-r11          SEQUENCE {
           carrierFreq-r11                  ARFCN-ValueUTRA,
           physCellId-r11                   CHOICE {
               fdd-r11                          PhysCellIdUTRA-FDD,
               tdd-r11                          PhysCellIdUTRA-TDD
           },
           cellGlobalId-r11                 CellGlobalIdUTRA        OPTIONAL
       }                                                        OPTIONAL,
       selectedUTRA-CellId-r11          SEQUENCE {
           carrierFreq-r11                  ARFCN-ValueUTRA,
           physCellId-r11                   CHOICE {
               fdd-r11                          PhysCellIdUTRA-FDD,
               tdd-r11                          PhysCellIdUTRA-TDD
           }
       }                                                        OPTIONAL
    ]]
}
```

Fig. 5

```
rlf-Cause-r11        ENUMERATED {
                             t310-Expiry, randomAccessProblem,
                             rlc-MaxNumRetx, t312-Expiry, spare1},
```

```
rlf-Cause-r11        ENUMERATED {
                             t310-Expiry, randomAccessProblem,
                             rlc-MaxNumRetx, t312-Expiry},
```

```
rlf-Cause-r11        ENUMERATED {
                             t310-Expiry, randomAccessProblem,
                             rlc-MaxNumRetx, spare1},
```

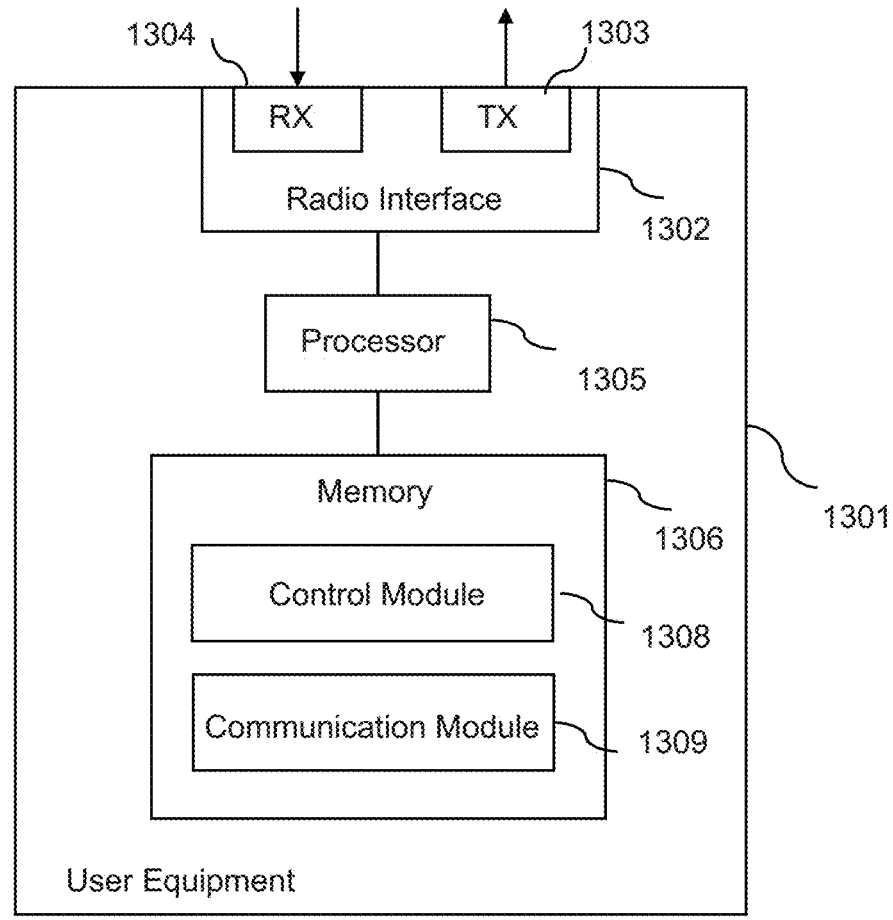

Fig. 13

| Timer | Start | Stop | At expiry |
|---|---|---|---|
| T312 | Upon triggering a measurement report for a measurement identity for which T312 has been configured, while T310 is running | Upon receiving N311 consecutive in-sync indications from lower layers, upon triggering the handover procedure, upon initiating the connection re-establishment procedure, and upon the expiry of T310 | If security is not activated: go to RRC_IDLE else: initiate the connection re-establishment procedure |

Fig. 14

MOBILITY ROBUSTNESS IN A CELLULAR NETWORK

RELATED APPLICATIONS

This application is a continuation of prior U.S. application Ser. No. 14/414,512, filed 13 Jan. 2015, which was the U.S. National Stage of International Application PCT/EP2015/050271 filed 8 Jan. 2015, which claims the benefit of U.S. Provisional Application No. 61/968,570, filed 21 Mar. 2014, the entire disclosure of each being hereby incorporated by reference herein.

TECHNICAL FIELD

The present invention relates to a method in a node of a cellular network for supporting mobility, to a method in a user equipment for supporting mobility in the cellular network, and to corresponding devices.

BACKGROUND

In a typical cellular network, also referred to as a wireless communication system, User Equipments (UEs), communicate via a Radio Access Network (RAN) to one or more Core Networks (CNs).

A user equipment is a mobile terminal by which a subscriber can access services offered by an operator's core network. The user equipments may be for example communication devices such as mobile telephones, cellular telephones, laptops or tablet computers, sometimes referred to as surf plates, with wireless capability. The user equipments may be portable, pocket-storable, hand-held, computer-comprised, or vehicle-mounted mobile devices, enabled to communicate voice and/or data, via the radio access network, with another entity, such as another mobile station or a server.

User equipments are enabled to communicate wirelessly in the cellular network. The communication may be performed e.g. between two user equipments, between a user equipment and a regular telephone and/or between the user equipment and a server via the radio access network and possibly one or more core networks, comprised within the cellular network.

The cellular network covers a geographical area which is divided into cell areas. Each cell area is served by a base station, e.g. a Radio Base Station, RBS, which sometimes may be referred to as e.g. "eNB", "eNodeB", "NodeB", "B node", or BTS (Base Transceiver Station), depending on the technology and terminology used.

The base stations may be of different classes such as e.g. macro eNodeB, home eNodeB or pico base station, based on transmission power and thereby also on cell size.

A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations.

In some radio access networks, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Special Mobile).

In 3rd Generation Partnership Project (3GPP) Long Term Evolution (LTE), base stations, which may be referred to as eNodeBs or eNBs, may be directly connected to one or more core networks.

UMTS is a third generation, 3G, mobile communication system, which evolved from the second generation, 2G, mobile communication system GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

Cellular communication networks evolve towards higher data rates, together with improved capacity and coverage. In 3GPP, standardization body technologies like GSM, HSPA and LTE have been and are currently developed.

To provide for mobility in the cellular network, the cellular network must perform several mobility functions such as handovers when the user equipment moves from one cell to another. A handover means that there is a change of serving cell for the user equipment from a so called source cell to a so called target cell. There are mechanisms in the cellular network to identify which cells are candidate target cells for handover. Typically, the user equipment regularly performs measurements to monitor which cells provide coverage at its current location. The measurement result is sent to a serving base station of the source cell in so called measurement reports. These measurement reports may be used to trigger a handover to the target cell in due time before the user equipment moves out of coverage from the source cell.

If the handover is triggered too early, the user equipment may not be able to connect to the target cell and there is a high probability for oscillating handovers.

If the handover is triggered too late the serving base station of the source cell may not receive the measurement report used for handover triggering, or the user equipment may not be able to receive a handover command from the serving base station of the source cell. Due to this, the handover may not be performed which may eventually lead to the user equipment moving out of coverage from the source cell, detecting a radio link failure, and losing its radio link connection to the cellular network, causing for example an ongoing call or a download to terminate prematurely.

In heterogeneous networks, high power base stations and low power base stations using the same frequency are deployed in the same area such that their coverage, or cells, in the cellular network overlap. Particularly in such environments many handovers may occur.

In view of the above, there is a need to improve robustness of mobility functions in a cellular network, in particular robustness of handovers.

SUMMARY

According to an embodiment of the invention a method for supporting mobility in a cellular network is provided. The method is for use in a node for the cellular network. According to the method, the node receives from a user equipment, an information of a radio link failure of a radio link between the user equipment and the cellular network and the node receives information related to a mobility of the user equipment. Based on the received information, the node adjusts at least one mobility parameter to increase robustness of mobility.

According to a further embodiment a method in a user equipment for supporting mobility in a cellular network is provided. According to the method the user equipment detects a failure of a radio link between the user equipment and the cellular network; the user equipment sends to a node of the cellular network, an information of the radio link failure of a radio link between the user equipment and the cellular network; and the user equipment sends information related to a mobility of the user equipment to the node.

According to a further embodiment, a node for a cellular network for supporting mobility in the cellular network is provided. The node comprises at least one interface; and at least one processor. The at least one processor is configured to receive from a user equipment, an information of a radio link failure of a radio link between the user equipment and the cellular network, to receive information related to a mobility of the user equipment, and based on the received information, to adjust at least one mobility parameter to increase robustness of mobility.

According to a further embodiment, a user equipment for supporting mobility in a cellular network is provided. The user equipment comprises at least one interface and at least one processor. The at least one processor is configured to detect a failure of a radio link between the user equipment and the cellular network, to send to a node of the cellular network, an information of a radio link failure of a radio link between the user equipment and the cellular network, and to send information related to a mobility of the user equipment to the node.

According to a further embodiment, a computer program or a computer program product is provided, which comprises program code to be executed by at least one processor of a node for a cellular network, wherein execution of the program code causes the at least one processor to perform steps of the method in a node for a cellular network for supporting mobility.

According to a further embodiment a computer program or a computer program product is provided, which comprises program code to be executed by at least one processor of a user equipment, wherein execution of the program code causes the at least one processor to perform steps of the method in a user equipment for supporting mobility in a cellular network.

Details of such embodiments and further embodiments will be apparent from the following detailed description of embodiments.

BRIEF DESCRIPTION OF DRAWINGS

FIG. 5 shows extractions of an ASN code of the Technical Specification 3GPP TS 36.331, V12.0.0.

FIG. 13 schematically illustrates exemplary structures of a user equipment according to an embodiment invention.

FIG. 14 shows a table describing a T312 timer.

DETAILED DESCRIPTION

Figure 1:
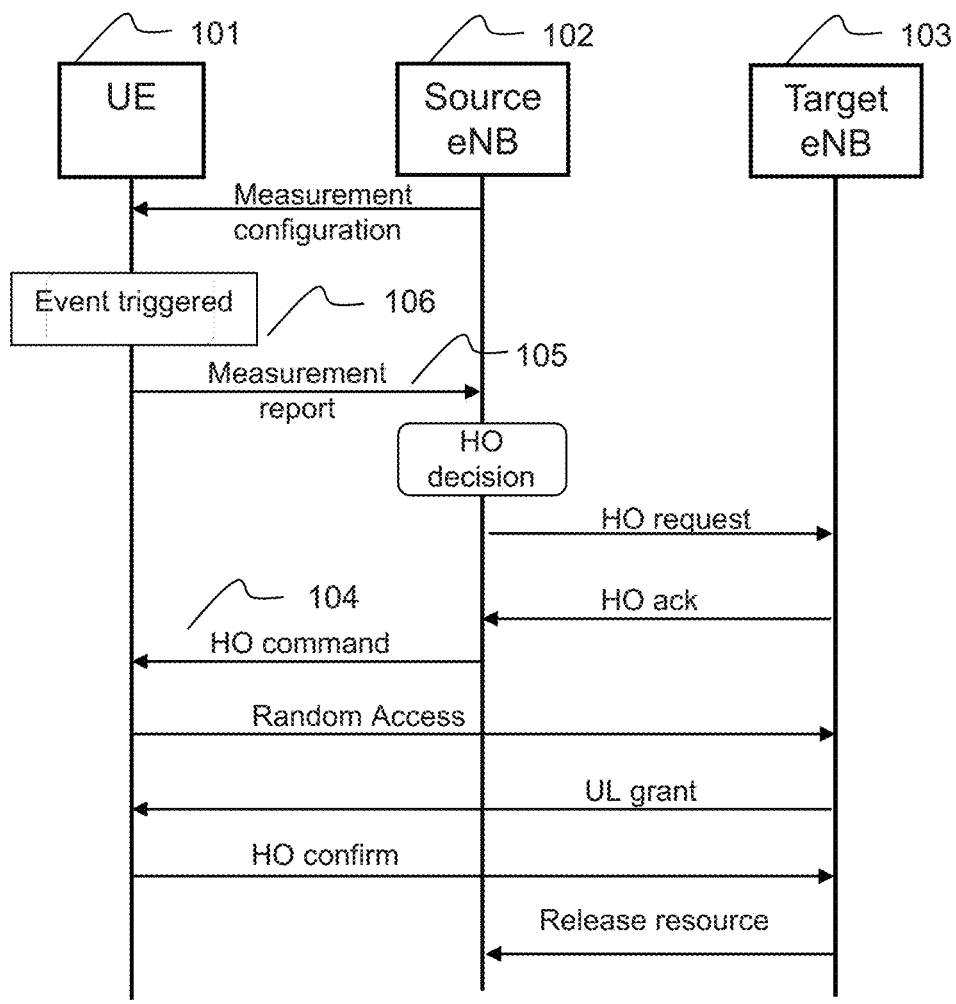
FIG. 1 shows a signaling diagram for schematically illustrating an example of a handover procedure.

In the following description, for purposes of explanation and not limitation, specific details are set forth such as particular architectures, interfaces, techniques, etc. in order to provide a thorough understanding of various concepts of the invention. However, it will be apparent to those skilled in the art that various concepts may be practiced in other embodiments that depart from these specific details. That is, those skilled in the art will be able to derive various arrangements which, although not explicitly described or shown herein, embody the concepts of this disclosure. In some instances, detailed descriptions of well-known devices, circuits, and methods are omitted so as not to obscure the description of the disclosure with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The illustrated concepts relate to supporting mobility and/or mobility robustness in a cellular network. Specifically, the concepts relate to supporting handovers and handover robustness in a cellular network. The cellular network may for example be based on one or more radio technologies, e.g., a cellular radio technology such as the LTE technology. Although the examples explained in the following refer to a cellular network based on the LTE technology, it is to be understood that the illustrated concepts could be also applied in connection with other communication technologies, e.g. other cellular radio technologies, such as UMTS (Universal Mobile Telecommunications System) technology, or a WiFi radio technology, or even wire-based technologies.

To optimize mobility robustness in a cellular network, handover parameters may be set and adapted to the local circumstances for the handovers between each of the cells. Mobility Robustness Optimization (MRO) has been introduced in 3GPP to automate a dynamic configuration of handover parameters. According to concepts discussed herein, it is proposed to extend such functionality, e.g., to combine failure information of handover procedure and radio link failure procedure to accurately adopt the handover parameters in order to optimize mobility robustness.

Mobility in cellular networks is subsequently discussed: The discussion refers in certain parts to the context of LTE, i.e. E-UTRAN. It should be understood that the problems and solutions described herein are equally applicable to wireless access networks and user equipments (UEs) implementing other access technologies and standards. LTE is used as an example technology where embodiments are suitable, and using LTE in the description therefore is particularly useful for understanding the problem and solutions solving the problem.

The protocol specification 3GPP LTE Radio Resource Control, RRC, protocol specification such as 3GPP TS 36.331 V12.0.0 defines a main signaling protocol for configuring, re-configuring and general connection handling in the LTE radio access network which is also known as E-UTRAN. The RRC controls many functions such as connection setup, mobility, measurements, radio link failure and connection recovery. These functions are of relevance for the present disclosure, and are therefore described in some further detail below.

A UE in LTE can be in two RRC states: RRC_CONNECTED and RRC_IDLE. In RRC_CONNECTED state, mobility is network-controlled based on e.g. measurements provided by the UE. I.e. the network decides when and to which cell an UE should be handed over, based on e.g. measurements provided by the UE. The network, i.e. the LTE radio base station (called eNB in E-UTRAN) configures various measurement events, thresholds etc. based on which the UE then sends reports to the network, such that the network can make a wise decision to hand over the UE to a stronger cell as the UE moves away from the present cell.

In RRC_IDLE, mobility is handled by UE-based cell-selection, where a nomadic UE selects the "best" cell to camp on, based e.g. on various specified criteria and parameters that are broadcasted in the cells. For example, various cells or frequency layers could be prioritized over other, such that the UE tries to camp on a particular cell as long as the measured quality of a beacon or pilot in that cell is a threshold better than some other beacon or pilot received from other cells.

The present disclosure is primarily focusing on problems associated with network-controlled mobility as described above, i.e. for an LTE UE in RRC_CONNECTED state. The problems associated with failing handovers are described in further detail below.

In a regular situation, and when a RRC_CONNECTED UE is moving out from the coverage of a first cell (also called source cell), it should be handed over to a neighboring cell (also called target cell or second cell) before losing the connection to the first cell. I.e. it is desirable that the connection is maintained without no or minimal disruption throughout the handover, such that the end-user is unaware of the ongoing handover. In order to succeed with this, it is necessary that the measurement report that indicates the need for mobility is transmitted by the UE and received by the Source eNB, and the Source eNB has sufficient time to prepare the handover to the target cell (by, among other things, requesting a handover from the Target eNB controlling the target cell), and the UE receives the handover command message from the network, as prepared by the Target eNB in control of the target cell and sent via the source cell to the UE.

FIG. 1 shows a signaling diagram schematically illustrating an example of a handover procedure, in which a UE 101 is handed over from a Source eNB 102 to a Target eNB 103. The illustrated procedure is a simplified illustration of a LTE handover, HO, procedure. It should be noted that a HO command 104 is in fact prepared in the Target eNB 103, but the message is transmitted via the Source eNB 102, i.e. the UE 101 sees that the message comes from the Source eNB 102.

In addition, and in order for the handover to be successful, the UE 101 must finally succeed in establishing a connection to the target cell, which in LTE requires a successful random access request in the target cell, and a subsequent HO complete message. (It should be noted that specifications may differ somewhat in the naming of messages. This does not limit the applicability of the present disclosure).

Thus, it is clear that in order to succeed all this, it is necessary that the sequence of events leading to a successful handover is started sufficiently early, so that the radio link to the first cell (over which this signaling takes place) does not deteriorate too much before completion of the signaling. If such deterioration happens before the handover signaling is completed in the source cell (i.e. first cell), then the handover is likely to fail. Such handover failures are clearly not desirable. The current RRC specification therefore provides various triggers, timers, and thresholds in order to adequately configure measurements, such that the need for handovers can be detected reliably, and sufficiently early.

In FIG. 1, an exemplified measurement report 105 is triggered by a measurement event 106 (e.g. so called A3 event: in short: A neighbor cell is found to be an offset better than the current serving cell). It should be noted that there are multiple events that can trigger a report.

It may occur that a UE loses coverage to the cell that the UE is currently connected to. This could occur in a situation when a UE enters a fading dip, or that a handover was needed as described above, but the handover failed for one or another reason. This is particularly true if the "handover region" is very short. By constantly monitoring the radio link quality, e.g. on the physical layer as described in 3GPP TS 36.300 V12.0.0 and TS 36.331 V12.0.0, the UE itself is able to declare a radio link failure and autonomously start a RRC re-establishment procedure. If the re-establishment is successful (which depends, among other things, if the selected cell and the eNB controlling that cell was prepared to maintain the connection to the UE), then the connection between the UE and the eNB can resume. A failure of a re-establishment means that the UE goes to RRC_IDLE and the connection is released. To continue communication, a new RRC connection has then to be requested and established.

Concepts related to handover and radio link failure robustness are discussed in the following: The recent and rapid uptake of Mobile Broadband has led to a need for increasing the capacity of cellular networks. One solution to achieve such a capacity increase is to use denser networks consisting of several "layers" of cells with different "sizes": Macro cells ensure large coverage with cells encompassing large areas, while micro-, pico- and even femto-cells are deployed in hot-spot areas where there is a large demand for capacity. Those cells typically provide connectivity in a much smaller area, but by adding additional cells (and radio base-stations controlling those cells) capacity is increased as the new cells off-load the macros.

The different "layers" of cells can be deployed on the same carrier (i.e. in a reuse-1 fashion), the small-cells could be deployed on a different carrier, and the different cells on the various layers could even be deployed using different technologies (e.g. 3H/HSPA on the macro- and micro-layer, and LTE on the pico-layer as one non-exclusive example).

Figure 2:
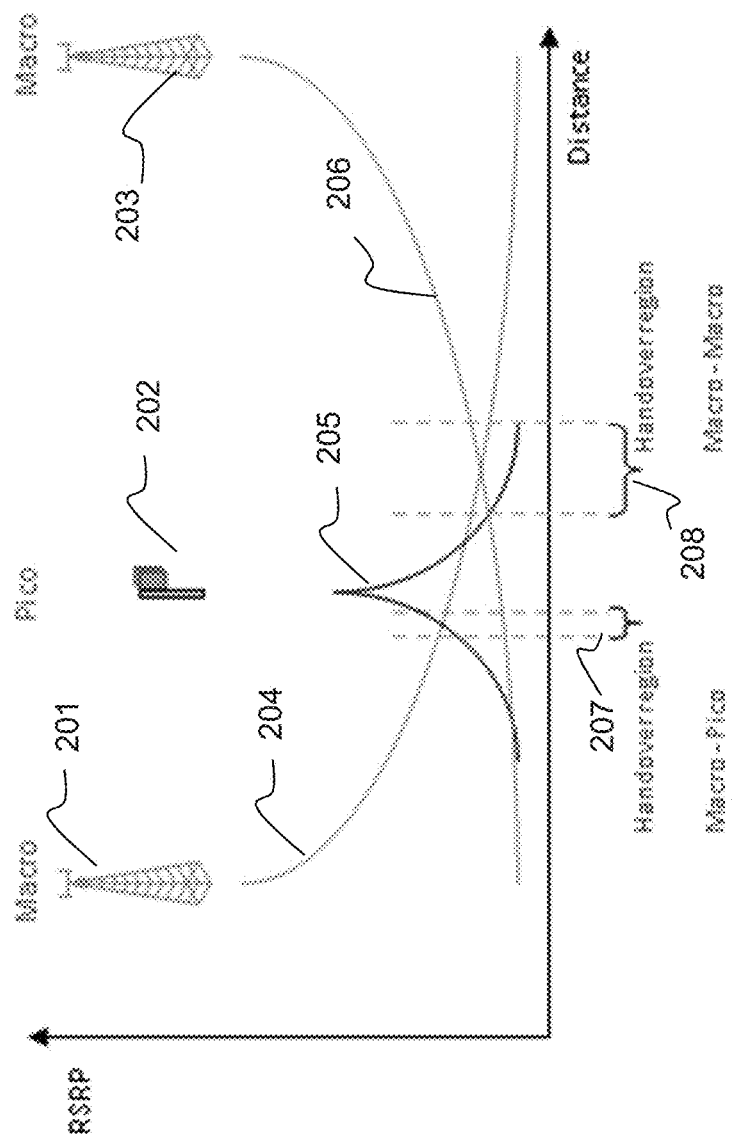
FIG. 2 shows received signal powers and handover regions in an exemplary cellular network scenario.

There is currently a large interest for investigating the potential of such Heterogeneous Networks, and operators are interested in such deployments. However, it has also been found that such Heterogeneous Networks may result in an increased rate of handover failures, as briefly discussed above. One reason is that the handover region in Heterogeneous Networks may be very short, meaning that the handover might fail since the UE lost coverage to the source cell before the handover to a target cell could be completed. For example, when a UE leaves a pico-cell, it may happen that the coverage border of the pico is so sharp, that the UE fails to receive any handover command towards a macro before losing coverage to the pico (see FIG. 2 for further explanation). FIG. 2 shows Reference Signal Received Power (RSRP) for handovers between Macro and Pico.

In particular, FIG. 2 shows received signal powers (RSRP) as a function of distance in an exemplary cellular network scenario. The cellular network scenario comprises a macro base station 201, a pico base station 202, and a further macro base station 203. Curves 204, 205 and 206 show RSRP a UE receives from macro base station 201, pico base station 202, and macro base station 203 respectively as a function of distance from the respect node. A handover region 207 for a handover between macro base station 201 and pico base station 202 and a handover region 208 for a handover between macro base station 201 and macro base station 203 are indicated in the FIG. 2.

A problem could also occur when a UE connected to a macro suddenly enters a pico on the same carrier: It could now happen that the control channels of the pico interferes with the signals that the UE needs to receive from the macro in order to complete the handover, and the handover thus fails.

In order to investigate the consequences of increased handover failures and solutions to mitigate those, 3GPP is currently working on evaluations and technical solutions for amendments, as described in 3GPP TR 36.839 V11.1.0.

Radio link monitoring, RLM, concepts are discussed subsequently: In order to detect radio link failures (RLFs) the UE may implement a radio link monitoring (RLM) mechanism, which is described in 3GPP TS 36.331 V12.0.0. RLM parameters are configured by RRC. For this purpose the UE evaluates the radio link and upon N310 consecutive "out-of-sync" indications received from lower layers (see 3GPP TR 36.133 V12.2.0 for details), the UE starts the timer T310. The timer may be stopped upon N311 consecutive "in-sync" indications. After expiry of T310 the UE will declare RLF to be detected and start the RRC reestablishment procedure. A radio link failure detected during the handover procedure leads to an abort of the handover procedure, i.e. the handover is not successful.

Figure 3:
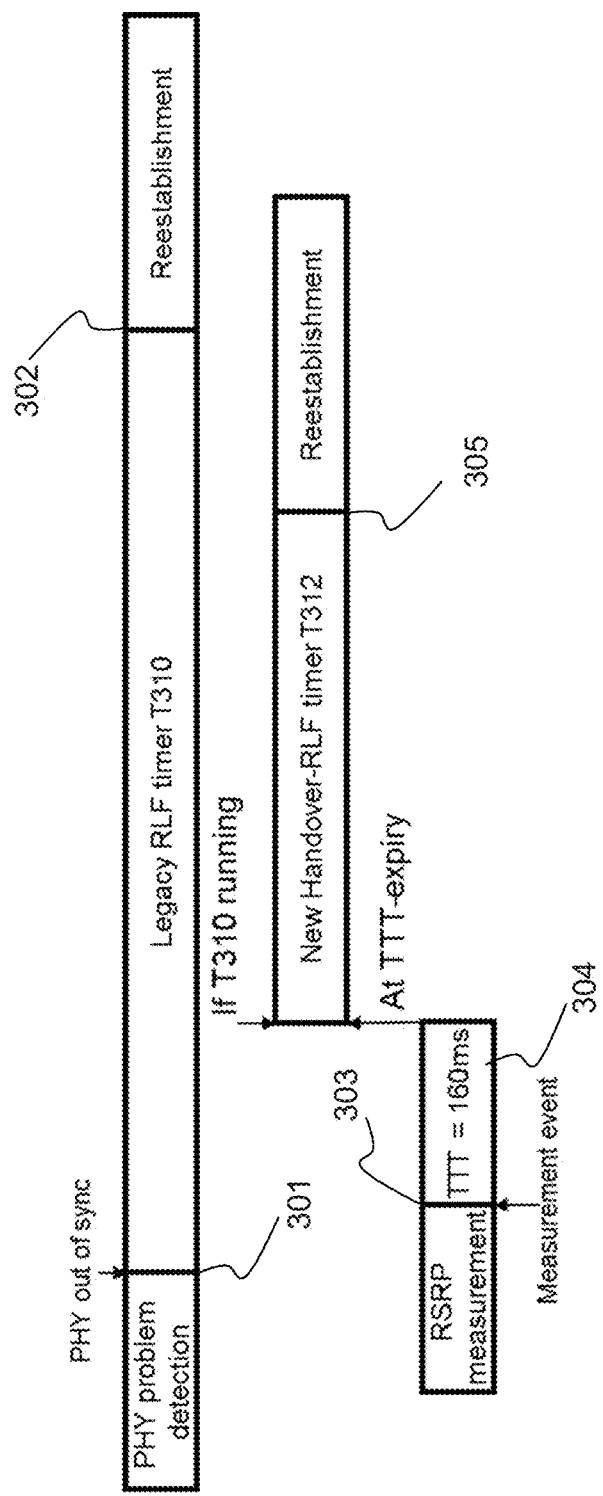
FIG. 3 shows a timing diagram for schematically illustrating an example of a procedure for detecting a radio link failure on the basis of timers.

FIG. 3 schematically illustrates an example of detecting a radio link failure on the basis of timers. Upon detection of a PHY (Physical layer) problem an RLF timer T310 is started, see point 301. Upon expiry of T312, a reestablishment procedure may be started, see point 302. When T310 is running after a measurement event 303 and a subsequent Time To Trigger (TTT) 304 the handover RLF timer T312 is started. Upon expiry a reestablishment procedure may be started even before RLF timer T310 is expired, see point 305.

Subsequently Fast RLF recovery with Handover-RLF timer T312 in 3GPP Rel-12 is discussed. As an enhancement for radio link failure detection a so called "Handover-RLF" timer T312 will be introduced in 3GPP Rel-12 as described in the change request R2-140923, entitled 'Fast RLF recovery'. The T312 timer is an example of a handover timer. The idea is to trigger RLF faster, i.e. reduce the service interruption time for the user, in case that RLF is detected while handover is currently ongoing: the described Handover-RLF timer T312 is started when a certain measurement event had triggered (indicating start of handover procedure) and when at the same time the legacy RLF timer T310 is already running. Usage of T312 per measurement event as well as length of the timer is configurable. In other words, T312 may be started if T310 is running and after a measurement event took place.

As mentioned above, in FIG. 3, the usage of the Handover-RLF timer T312 is illustrated. At expiry of a measurement event trigger (for whose measld the usage of this timer is configured) the timer T312 will be started, if RLF timer T310 is running already. Assuming that T312 is shorter than T310, the reestablishment procedure can be initialized earlier which reduces its service-interruption time. The timer T312 will be stopped with the same conditions as T310, i.e. upon PHY layer recovery (after N311 PHY in-sync indications). A timer value for T312 of Oms will lead to an early termination of T310, i.e. to start Reestablishment directly. Furthermore, in e.g. R2-140562 and in R2-140923 it is proposed to include a flag indicating RLF due to T312 expiry in the RLF report as will be discussed further below. The contribution in R2-141023 also relates to a context of the timer T312.

Subsequently a Mobility Robustness Optimization, MRO, is described. Configuring all the HO parameters manually in order to avoid the aforementioned problems such as radio link failure is too expensive and can be very challenging. As such, Mobility Robustness Optimization (MRO) has been introduced in 3GPP to automate the dynamic configuration of handover parameters.

Essentially, MRO tries to identify the following three situations, and based on the statistical occurrence of these, tries to adjust the HO parameters.

Too Late HO: a UE is handed over late to the target cell, so that the link to the source cell breaks before completing the handover.

Too Early HO: a UE is handed over to a candidate cell too early resulting in a radio link or handover failure in the target cell. The UE returns soon to the source cell via re-establishment procedures.

Handover to wrong cell: a UE is handed over to one target cell but it experiences a RLF within a short duration after that in the target cell and the UE re-establishes the connection at another cell. A proper parameter setting would have most probably have led to the handing over of the UE to the last target cell to begin with.

MRO may try to gather statistics on the occurrence of Too Late HOs, Too Early HOs and HO to the wrong cell, and these statistics are used to adjust the handover parameters.

A non-exhaustive list of handover parameters controlling the event driven reporting of the UE and that can be adjusted by MRO is reported below:

A threshold indicating how much higher or lower the reference signal of a certain candidate cell needs to be before it is reported to the serving cell; a threshold indicating how much higher or lower the reference signal of the serving cell needs to be before a mobility event may be triggered; a filter coefficient applied to the measurement before evaluation triggers are considered; a time to trigger meaning the time window within which the triggering condition needs to be continuously met in order to trigger the reporting event in the UE.

For example, a higher 'too early handover' ratio than desired can be counter-acted by increasing the threshold of candidate target cell, e.g. delaying the triggering of an A3 event. Another example could be the resolving of a higher 'handover to wrong cell' ratio than desired by increasing the threshold towards the first, unwanted, target cell.

Three main messages, namely RLF report included in RRC: UEInformationResponse message (between the UE and eNBs), X2: RLF INDICATION (between eNBs) and X2: HANDOVER REPORT (between eNBs) are used by MRO to communicate/gather information regarding Too Early Handover, Too Late Handover and Handover to the wrong cell. See e.g. 3GPP TS 36.300 V12.0.0, TS 36.331 V12.0.0 and TS 36.423 V12.0.0.

Figure 4A:
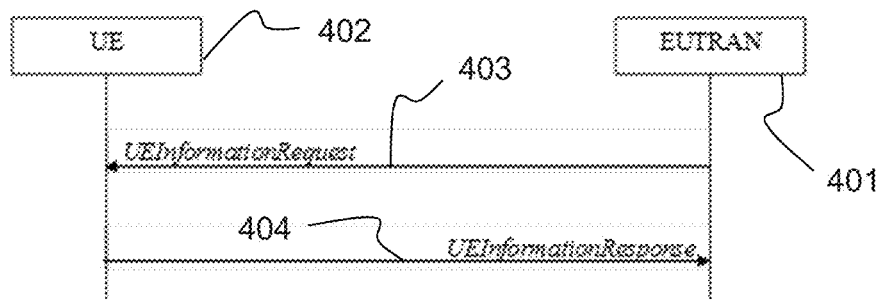
FIG. 4A shows a signaling diagram for schematically illustrating an example of information reporting between a UE and a cellular network.

FIG. 4A schematically illustrates an example of information reporting between a UE 402 and a cellular network EUTRAN 401. The eNB to which the UE is reconnecting to, either through a successful RRC re-establishment or via RRCConnectionSetup after IDLE mode, can ask for more detailed information about the failure after the connection is completed. This is done via the UE Information Request procedure, where the eNB can ask for RLF report, as shown in FIG. 4A, see 3GPP TS 36.331 V12.0.0. Accordingly, the EUTRAN 401 sends a UEInformationRequest message 403 to the UE 402

The UE 402 responds by sending a UEInformationResponse message 404 with a detailed RLF report which can include information such as (see 3GPP TS 36.331 V12.0.0):

Measurement result of the last served cell before RLF; Measurement result of the neighbor cells performed before RLF; Location info, which can include last co-ordinates as well as velocity of the UE when RLF was detected; E-CGI (and if that is not available Physical Cell ID (PCI)) of the cell where RLF occurred; E-CGI of the cell that the re-establishment attempt was made at; If the RLF occurred after the reception of a HO command (i.e.

RRCConnectionReconfiguration message including the mobilityControlInfo): The E-CGI where this message was received, Time from reception of HO Command to occurrence of RLF; The elapsed time from RLF occurrence to signaling by the UE of the RLF report; Failure type: i.e. whether it is a normal radio link failure or a handover failure; Cause for the RLF: i.e. whether RLF is due to maximum number of RLC retransmission, expiration of T310 timer, RACH access failure; C-RNTI of the UE in last serving cell; and Information about last serving and re-establishment UTRAN cells, for cases of LTE-UTRAN mobility.

Using the information above the eNB can deduce whether for example the RLF was due to incorrect HO parameters (too early, too late, HO to wrong cell), due to a coverage hole (no cell with sufficient signal strength) or due to inappropriate selection of handover target given the UE conditions, e.g. UE speed.

Figure 4B:
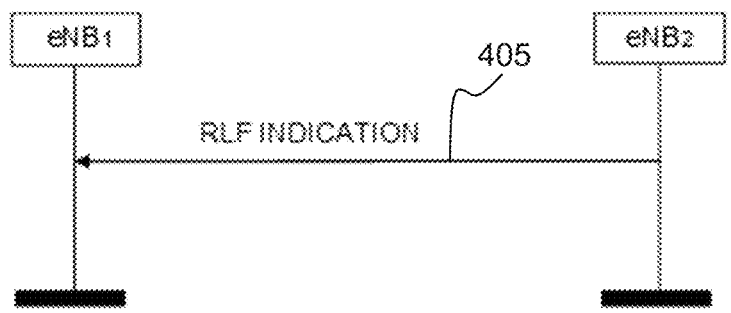
FIG. 4B shows a signaling diagram for schematically illustrating an example of indicating a radio link failure from one node to another.

FIG. 4B schematically illustrates an example of indicating a radio link failure from one node to another. Therein, an RLF INDICATION message 405 is sent from eNB2 to eNB1. As stated in 3GPP TS 36.423 V12.0.0, the purpose of the Radio Link Failure Indication procedure is to enable mobility robustness improvement in E-UTRAN by passing information about a failure event over the X2 interface.

When a re-establishment request is received or a connection failure reported after RRC connection setup or an incoming successful handover, the eNB uses the cell identifiers provided by the UE to identify the potentially previous serving cell/eNB. The eNB that received the information about the failure sends a RLF INDICATION message to the concerned eNB(s). The previously serving eNB may then match the correct context, or use the information available in the RLF report, if included in the RLF INDICATION message, to analyze the possible root cause of the failure.

The eNB2 initiates the procedure by sending the RLF INDICATION message to eNB1 following signaling of an RLF report or of a re-establishment attempt from a UE at eNB2, when eNB2 considers that the UE may have previously been served by a cell controlled by eNB1. Amongst other parameters the RLF Indication may contain the RLF report signaled by the UE to eNB2.

Figure 4C:
FIG. 4C shows a signaling diagram schematically illustrating an example of reporting a handover.

FIG. 4C schematically illustrates an example of reporting a handover. Therein, a HANDOVER REPORT 406 is sent from eNB1 to eNB2. As specified in 3GPP TS 36.423 V12.0.0, the Handover Report procedure is used to pass information connected to the analysis of an RLF which occurred shortly after a successful handover.

The eNB where the RLF occurred (original target eNB) sends a HANDOVER REPORT message to the original source eNB, identifying the source cell, the target cell, and the cell where re-establishment took place.

If an eNB receives an RLF INDICATION message from a neighbour eNB, the eNB may respond to the eNB sending the RLF Indication or to a third eNB previously serving the UE (case of HO to wrong cell) by sending a HANDOVER REPORT message that indicates Too Early Handover or HO to wrong cell, as shown in FIG. 4C.

Amongst other parameters the HANDOVER REPORT may contain the RLF report previously received via RLF INDICATION. The HANDOVER REPORT can also be used to indicate Inter RAT Ping Pong events between eNBs.

FIG. 5 shows extractions of an ASN code. In particular, a VARRLF-Report is shown. The UE variable VarRLF-Report is part of the RRC: UEInformationResponse message and includes the radio link failure information or handover failure information. This is defined in 3GPP TS 36.331 V12.0.0 and is shown in FIG. 5.

Figure 6:
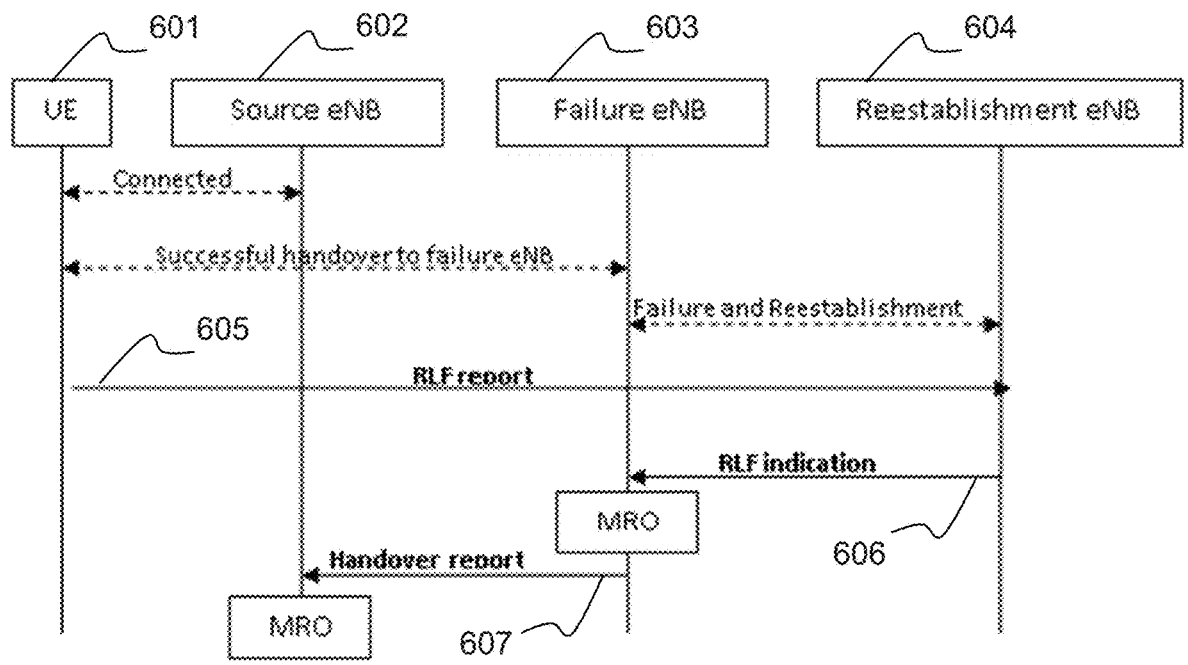
FIG. 6 shows a signaling diagram for schematically illustrating an exemplary scenario having Mobility Robustness Optimization, MRO, function(s).

FIG. 6 schematically illustrates an exemplary scenario having Mobility Robustness Optimization, MRO, function(s). In FIG. 6 a typical MRO scenario is illustrated. A UE 601 is in the beginning connected to a Source eNB 602 and undergoes a successful handover to a Failure eNB 603. The connection to the Failure eNB 603 fails and the UE 601 reestablishes in a Reestablishment eNB 604. Then, the UE 601 may send the RLF report 605 to the Reestablishment eNB 604, which forwards it with further information within the RLF indication 606 to the Failure eNB 603. MRO mechanisms may be applied in this eNB 603. In case the connection of the UE 601 had failed quickly after the handover to the Failure eNB 603, it is further beneficial to inform the Source eNB 602 about it with the Handover report 607 which includes also the RLF report. In this case also the Source eNB 602 will apply MRO mechanisms. In some parts of the disclosure, both Source eNB 602 and Failure eNB 603 are denoted as "MRO-applying network entities". This does not exclude that those MRO mechanism may be partly applied in further network nodes (e.g. OAM nodes, see below), which may influence parameter settings in Source eNBs and Failure eNB. Such a MRO mechanism may be implemented in any node of a cellular network. One may also refer to the network elements by network node.

Figure 7:
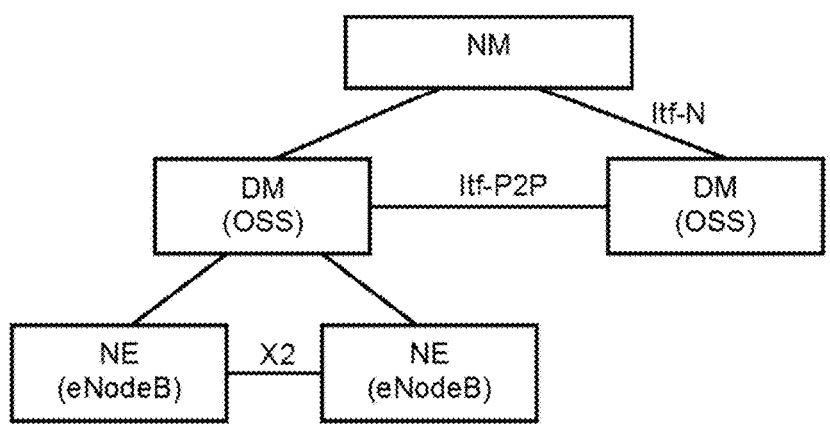
FIG. 7 schematically illustrates an exemplary network architecture, in which concepts of the invention may be applied.

FIG. 7 schematically illustrates an exemplary network architecture in which concepts of the invention may be applied. The exemplary network architecture comprises a management system. The node elements (NE), also referred to as eNodeB, are managed by a domain manager (DM), also referred to as an operation and support system (OSS). A DM may further be managed by a network manager (NM). Two NEs are interfaced by an X2, whereas the interface between two DMs is referred to as Itf-P2P. The management system may configure the network elements, as well as receive observations associated to features in the network elements. For example, DM observes and configures NEs, while NM observes and configures DM, as well as NE via DM. Any function that automatically optimizes mobility parameters can in principle be execute in the NE, DM, or the NMS (Network Management System).

According to one concept, it is proposed to support combined information of a handover procedure and a radio link monitoring procedure e.g. in LTE. This especially applies to the Handover-RLF timer T312. Such an MRO scheme improves a handover performance and reduces the failures discussed above. An MRO scheme aims for increasing robustness of mobility.

A cellular network operator may configure a UE (via serving cell) with a certain RLM configuration (e.g. T310) and Handover-RLF combined timer T312 (introduced in Rel-12). This configuration may be adapted as well, depending on e.g. cell type (as defined in 3GPP TS 36.423 V12.0.0, Cell Type IE indicates the size of a cell), so it is not necessarily equal among cells. The configuration as well as potential detailed failure reasons and timing of failure can also be considered in MRO, i.e. this information can be considered in the cell that is deemed to apply changes to its mobility parameters in order to prevent failures to occur again. Configuration, failure reasons and timing shall be taken into account in order to weigh the adjustment of handover parameters between the two cells, e.g. the cell individual offset (CIO).

In one example, if a rather low T310 and/or T312 were configured in the UE, RLF due to T310 or T312 expiry would be more likely, thus the adjustment of the CIO may require more failure instances to be actuated or it may be applied in small steps. On the other hand, for higher T310 and/or T312, RLF is less likely, thus the reason for e.g. a too-late handover must lay in a suboptimal CIO, which should be adjusted after fewer failure instances and with higher adjustment steps.

In another example, if an RLF occurs due to T312 expiration instead of T310 expiration it is clear that a measurement report had been triggered (thus a potential target cell identified) and handover procedure initialized before RLF was detected. At the very minimum an RLF due to T312 expiration indicates that a measurement report was sent by the UE. These criteria should also be considered in MRO when deciding how to modify mobility parameters. For example, when modifying the CIO changes to this parameter might be taken in larger steps for cases when no measurement report was sent when RLF was detected. Similarly, if the eNB still keeps the UE context at the time failure information are received, an RLF due to T312 expiration combined with unsuccessful reception of a measurement report at serving eNB might still imply that aggressive adjustments on e.g. CIO need to be applied.

It is worth noting that MRO might also act upon TTT (Time To Trigger), e.g. in case of a too late HO this parameter could be shortened. However, the capability of MRO to adjust TTT in legacy systems is very limited due to the lack of information on whether the RLF occurred after a measurement report was triggered.

To automate this RLM-aware MRO the RLM configuration and detailed Handover-RLF reasons can be included in the RLF-report under certain circumstances as further described below.

Figures 8, 9A, 9B, 9C:
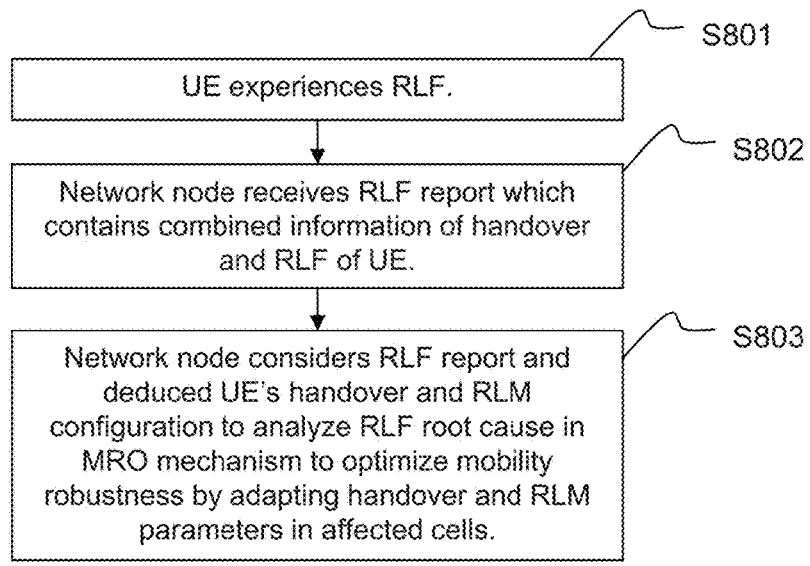
FIG. 8 shows a flowchart for illustrating a method according to an embodiment of the invention, which may be implemented in a cellular network.
FIG. 9A shows extractions of an ASN code for illustrating an embodiment of the invention.
FIG. 9B shows extractions of an ASN code for illustrating an embodiment of the invention.
FIG. 9C shows extractions of an ASN code of 3GPP TS 36.331 V12.0.0.

FIG. 8 shows a flowchart of a method according to one embodiment of the invention, which may be implemented in a cellular network. In a step S801, a UE experiences a radio link failure, RLF. In a step S802, a network node receives an RLF report. The RLF report is typically send from the UE to the network node. The RLF report shall comprise combined handover and RLF information of the UE. An example of such combined information is the T312 expiry in e.g. an RLF report. In a step S803, the network node considers the RLF report and deduces UE's handover and RLM configuration to analyze RLF root cause in MRO mechanism to optimize mobility robustness by adapting handover and RLM parameters in affected cells.

Subsequently an MRO mechanism is discussed. Cell relations for handover, i.e. handover thresholds and other parameters between cells can be configured on a per UE basis. A important parameter to configure the handover threshold is the cell individual offset parameter (CIO). Whether a handover is triggered earlier or later between two cells depends on the CIO parameters of the respective cells. Unsuccessful handovers may relate to too early or too late handovers and may be improved by adapting the CIO setting. Further parameters may influence the handover threshold: E.g. a handover event offset to trigger measurement report, e.g. A3 offset; a time to trigger (TTT) for handover measurement events can also be adapted to initiate the handover procedure earlier or later. Similarly to the CIO adaption, TTT adaption may also be done on a per cell relation basis (i.e. configured per target cell); a handover event configuration in general; handover measurement events that initiate a handover procedure may be configured or de-configured, e.g. A3, A5 event; blacklisting of certain cells or cells on certain carrier frequencies; the time between measurement report reception in the network and handover command transmission; the time between measurement report reception and handover request to another network node to initiate the handover procedure in the network.

In case of a too late handover, the handover threshold shall be decreased, e.g. the CIO difference between CIO of the target cell and CIO of the source cell shall be reduced. This reduction can be weighted based on further considerations as described below. In case of too early handover the handover threshold should generally be increased. In case of handover to wrong cell, handover threshold relations of at least three cells need to be considered and adapted.

Concepts of the invention refer to adapting the application of MRO, i.e. whether to adapt the handover threshold, which handover threshold, or how to weight the adaptation of those thresholds based on combined handover and radio link failure information, which are described in the subsequent sections. Examples of such combined information may be the T312 expiry e.g. in an RLF report or RLF information combined with information whether a measurement report has been sent.

Combined handover and radio link failure information is subsequently discussed. For the analysis whether a radio link failure's root cause is due to a coverage hole or e.g. too late handover, information about the measurement report transmission (which initiates the handover procedure) provides a foundation of root cause detection. In one embodiment, this information is utilized in MRO. Handover information is an example of information related to mobility.

In particular for this purpose, as part of the existing RLF-cause-r11 IE, an extra value as per example shown in FIGS. 9A and 9B below may be included (Concept of FIG. 9B is proposed in 3GPP draft R2-140562, entitled 'Fast RLF recovery').

FIG. 9A shows extractions of an ASN code according to an embodiment of this invention. FIG. 9B shows extractions of another ASN code according to an embodiment of this invention. In a further alternative the RLF-cause may be encoded in a different information element within the RLF report.

The inclusion of this cause value allows determining if the failure occurred after a measurement report was sent by the UE (since the entry conditions of T312 are both measurement report transmission as well as radio link failure state, expiry of T312 is therefore only possible if both conditions hold). This information is very important because it indicates to the failure eNB that conditions to trigger the handover were met, but that an RLF occurred before a HO Command could be received by the UE. Hence, from this information it can be deducted that the UE might have moved out of serving cell coverage shortly after reporting a measurement report. In case enough instances of failures including such information are recorded, the MRO algorithm (or any other algorithm using such information, e.g. in OAM, Operation Administration and Maintenance) may therefore infer that a possible adjustment to prevent such failure could be to anticipate signaling of the measurement report, i.e. to anticipate the entering condition for the mobility event(s) possibly triggering measurement reports. The latter can be achieved for example by increasing the threshold on the serving cell signal; or decreasing threshold on target cell signal; or modifying the hysteresis values in a way to anticipate the event reporting; or reducing the time to trigger for starting the handover procedures (i.e. triggering HO command signaling; or parts or all of the above.

This information can be combined with the possibility of retrieving the UE context via information in the RLF report. In fact, since Release 11, the RLF report contains the c-RNTI of the UE used in the last serving eNB. The last serving eNB receiving the RLF report (via RLF Indication or Handover Report) may still have the UE Context associated to the c-RNTI in the RLF report stored. If the context is still available, the last serving eNB would be also able to understand if the Measurement Report was received (expiration of T312 only indicates that the measurement report was sent by the UE). The latter is another piece of important information because it indicates that before the RLF was declared the UE was in channel conditions able to send and receive a measurement report. As mentioned before, this information would be useful in choosing how to scale the adjustment of the handover thresholds (e.g. CIO) towards the potential handover target cells.

Further explanation: According to 3GPP TS 36.331 V12.0.0, the RLF report includes the time of failure relative to the last RRC-Reconfiguration with mobility control; and also the time between failure and signaling of the RLF report, so the network knows the absolute time when the failure had happened. However, it does not know if the measurement report had been tried to be sent already; it only knows the measured values from the RLF report. Further, it does not know the time relation between measurement event trigger and RLF. As stated above, this may be quite interesting though for e.g. handover threshold adaptation, especially considering that measurement report failure is a common failure reason e.g. in heterogeneous networks. Including the T312 expiry failure reason in the report, the network could deduce if the measurement report had been triggered previously to RLF and also when it was triggered, since the T312 value is configurable.

So, in order to adapt the configured T312 value, it would be good if the failure reason is considered explicitly in the RLF report. For example: If a lot of T312 related failures are observed as compared to T310 related failures the network may increase the value of T312 or de-configure the usage of T312 entirely. Alternatively or in addition, whether the measurement report had been triggered by the UE could also be explicitly indicated in the RLF report. A flag could indicate if the measurement report had been sent, or a list of cells that fulfilled the measurement report triggering conditions (before or after TTT) could be included in the RLF report. In a further addition, the UE could include in the RLF report the information whether the UE received an RLC ACK for the measurement report. That would be an indication that the measurement report was also successfully received by the network.

Further, since possible multiple measurement events (measurement IDs) may be configured to use T312, it is unclear to the network which of those measurement events had triggered the T312 start (as the first event). For this purpose the information about the measurement event that triggered T312 (as the first event) shall also be included in the RLF report. This inclusion may be conditional, only in case the failure cause is T312. Even in case T312 is not used it is beneficial to include the measurement ID of the measurement event that triggered a measurement report.

By enabling the existing "timeSinceFailure-r11" IE or another information element to also indicate the time since the T312 triggered RLF it is also possible to know the absolute time the T312 RLF occurred. This is useful in order to filter out failure events that were reported after mobility parameter changes were already applied.

A flag explicitly indicating how long it had passed since the measurement report is sent to RLF occurrence (e.g. in cases where T312 expiry is not the RLF reason or is not used) can help understanding whether the action of sending an HO command shall be anticipated. This time information can be given on a per measurement ID level in case of multiple measurement events. Further, this information might be used to apply adjustments of the handover thresholds, e.g. time to trigger, or configured T310 value.

In another embodiment, the time how long T310 had been running when RLF is triggered (e.g. by T312 expiry) can be included in the RLF report. This information can be utilized to optimize the setting of T310 and T312 and handover thresholds. Example: In case T310 had been running for a long time when RLF is triggered, handover thresholds shall be reduced towards the target cell in case the RLF can be identified as related to a handover instead of a coverage hole.

Subsequently a utilization of radio link monitoring configuration is discussed. In one embodiment the configured length of T310 and/or T312 possibly in combination with an indication whether a measurement report had been sent and/or received by the UE (acc. to previous section) is utilized for the adaptation of the handover thresholds.

Depending on the length of T310 and/or T312 and how often RLF was triggered before or after transmission of a measurement report, the handover threshold adaptation should be influenced (example: weight of CIO reduction lower in case T312 was chosen short and a lot of failures occurred).

The MRO-applying network entity may take the following possible actions in terms of handover threshold adjustment: the lower T310 and/or T312 the lower the weight of the failure event on a decision to change (anticipate) the handover threshold. The weight of each failure might become zero if T310 and/or T312 thresholds are configured below a given value in the failure eNB.

Example: if a rather low T310 and/or T312 were configured in the UE, RLF would be more likely, thus the adjustment of the CIO should not be very strong. On the other hand, for higher T310 and/or T312, RLF is less likely, thus the reason for e.g. a too-late handover must lay in a suboptimal CIO, which should be adjusted more strongly.

The network entity receiving the RLF report and executing MRO is aware of the UE's RLM configuration in case the UE context is still available. Given that the UE can go to Idle and after signalling the RLF Report, the UE context might be lost in failure eNB, the RLM configuration might be unknown in the network. Given that the T310 and/or T312 timer is configurable on a per UE basis, its duration might be lost once the UE context is deleted and the information about how long before the RLF the measurement report was sent will be lost as well. Hence RLM information, e.g. configuration, should be stored in the RLF report. Further, enhancements of the RLF report described in the previous section may be required for adaptation purposes as well.

Subsequently a utilization of mobility state estimation (MSE) is discussed. The network provides the UE with parameters to scale TTT based on estimated speed. The speed estimate itself however is left to UE-implementation, so that the network cannot accurately know which TTT value had been used by the UE.

In one embodiment, when adapting handover thresholds in an MRO mechanism, the mobility state estimate of the UE should thus be considered as well.

Therefore, the Mobility State Estimation together with the T312 triggered RLF information as described above may be included in the RLF report.

An addition of Mobility State Estimation has been proposed in 3GPP, see 3GPP contribution R3-140130, entitled MRO and TTT scaling. However, it needs to be noted that having information about MSE, which allows to understand the level of TTT scaling performed by the UE, without having information on whether a measurement report was triggered before the RLF occurred is of little use and could in fact lead to wrong actions such as modifying TTT when failures occur without measurement reports even being triggered.

According to one concept of the invention, it is proposed to report the MSE and to evaluate the scaling produced by the MSE on the TTT in light of the information of whether a T312 triggered RLF occurred. If a T312 triggered RLF occurred, then an evaluation on whether to modify TTT or whether to discard the failure event from the statistics (e.g. due to unexpected mobility state estimation by the UE) can be taken.

The elapsed time from time of measurement report, plus the MSE could give an idea of whether the UE has scaled TTT too aggressively and if the HO command has been sent too late. That could bring to e.g. filtering out failures for UEs that "seem" to estimate MSE in an unpredictable way or it would lead to reducing time from measurement report and HO command.

Subsequently an interaction with the OAM system is discussed. In another embodiment the enhanced information on failure events, for example the enhanced RLF reports or part of the information included in it, collected by eNBs can be forwarded to the OAM system and analyzed therein. On the basis of mobility failure statistics signaled by the eNB to the OAM, the OAM system can take decisions on how to modify mobility parameters similar to those described in embodiments above. The OAM system can then signal to the eNBs in need of modification of mobility parameters, or in general of optimized configuration, new parameters calculated on the bases of the reported statistics. For example, the OAM may signal new values of the Cell Individual Offsets relative to one or more neighbor cell relation.

Concepts presented herein enable more robust mobility in cellular networks such as LTE by enhanced MRO mechanisms utilizing combined handover procedure and radio link failure procedure information. Especially in heterogeneous networks, where different configurations for UEs in different cell types are applied and handover/radio link failure are more frequent, it becomes important to consider these handover and radio link failure configurations and observed information in MRO.

Figure 10:
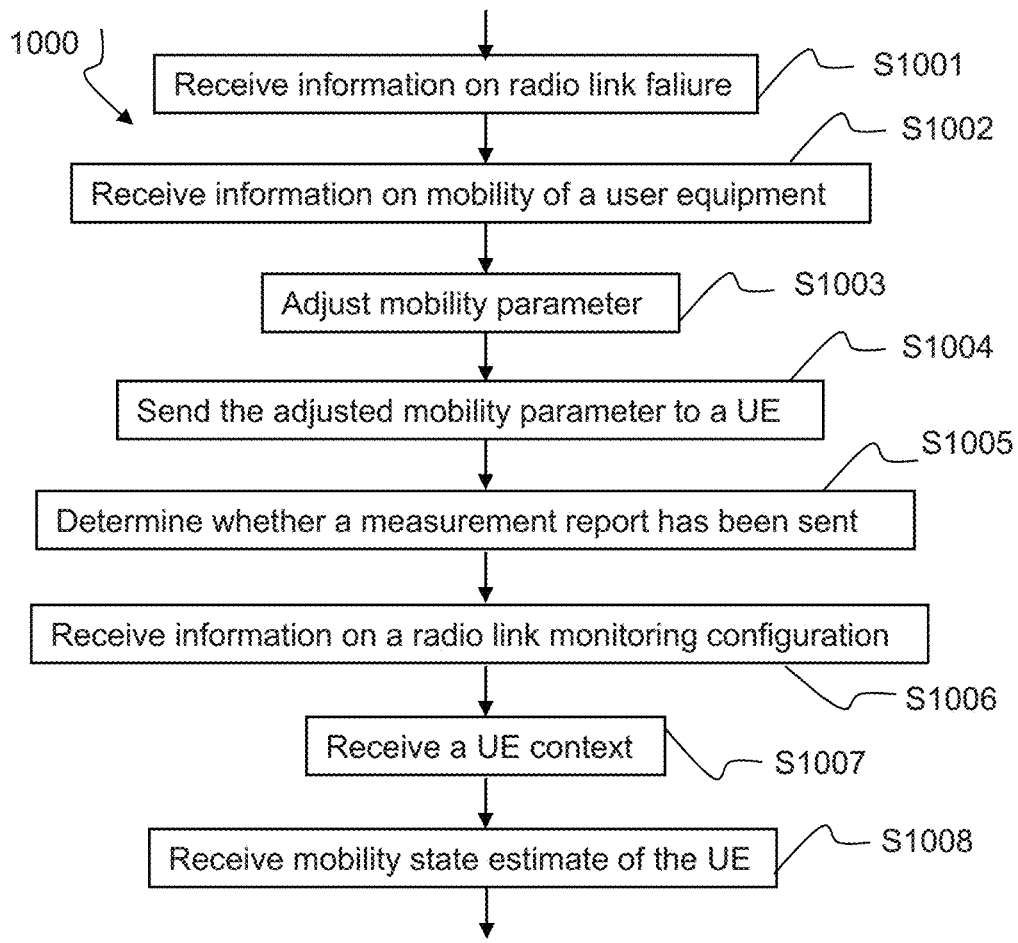
FIG. 10 shows a flowchart for illustrating a method according to an embodiment of the invention, which may be used for implementing a mobility support function in a node of a cellular network.

FIG. 10 shows a flowchart for illustrating a method 1000 in a node for a cellular network for supporting mobility in the cellular network, which may be used for implementing a mobility support function in a node of a cellular network. If a processor based implementation of the node is used, the steps of the method may be performed by one or more processors of the node. For this purpose, the processor(s) may execute correspondingly configured program code. Further, at least some of the corresponding functionalities may be hardwired in the processor(s). The method may be implemented in a Mobility Robustness Optimization, MRO, function of the node. Certain aspects of MRO have been discussed above.

The node of a cellular network may be an eNodeB, a NodeB, an RNC, a BSC, a network management node or domain management node such as an OSS or a combination of some of those nodes.

At step S1001, the node receives, from a user equipment, an information of a radio link failure of a radio link between the user equipment and the cellular network. The information may be received in a direct or indirect manner. The information may be received in a Radio Link Failure, RLF, report. Certain aspects of RLF reporting have been discussed above.

At step S1002, the node receives information related to a mobility of the user equipment.

At step S1003, the node adjusts, based on the received information, at least one mobility parameter to increase robustness of mobility. Based on the received information, the node may determine a root cause of the radio link failure. Such determination may support the adjustment of the at least one mobility parameter. The adjustment may take place in a source cell or a target cell of the handover or in a cell to which the link failed or in a reestablishment cell. Adjustment may comprise sending an indication of the adjusted handover parameter to a user equipment.

The node may receive information from more than one user equipment. Based on the received information the node may determine a handover situation for one or more UEs such as 'too late HO', "to early HO' or 'HO to wrong cell' or 'failure due to coverage hole' as discussed above. Such information or statistic on such information may be a basis for adjusting certain mobility parameters. Adjusting of a mobility parameter may be increasing or decreasing a parameter by a certain step. Several examples of different mobility parameters and ways of adjusting them have e.g. been discussed above.

In an optional step S1004, the node sends the adjusted mobility parameter to a user equipment. The adjusted mobility parameter may be sent in a direct or indirect manner.

The node may send the adjusted mobility parameter to the user equipment from which the information is received and/or to another user equipment. The adjusted mobility parameter may also be sent to all or a subset of all user equipments of one cell, such as a serving cell, a target cell or a reestablishment cell.

The information related to the mobility of the user equipment comprises information of at least one of: a handover configuration; a handover timer such as a setting of the timer T312; a radio link failure timer such as a setting of the timer T310; whether the user equipment has send a measurement report, e.g. the measurement report send in a handover procedure; whether the network has received a measurement report from the user equipment; a failure cause, e.g. a reason that caused the failure or the expiry of the T312 timer; expiry of a handover timer e.g. timer T312; expiry of a radio link failure timer e.g. timer T310; whether a handover timer has expired; a list of cells fulfilling triggering conditions of a measurement report; a measurement event e.g. a measurement ID or the measurement event that has triggered a handover timer; a time period since a handover timer is triggered; a time period between sending a measurement report and occurrence of a radio link failure; a time period since a handover timer is running; and a time period since a link failure timer is running. Such parameters are discussed in further detail above.

In an optional step S1005 the node determines from the information related to the mobility (e.g. from the expiry of a handover timer) whether a measurement report has been sent by the user equipment. In one example, it may be determined that a measurement report has been sent before the radio link failure is detected. Such measurement report may initiate a handover, which is not successful due to the radio link failure. So a radio link failure may have occurred before a handover procedure has been finalized, e.g. before a HO Command has been received by the UE. In other words, the measurement report that has been sent may refer to a measurement report initiating a handover procedure that failed due to the radio link failure. Such and other concepts are further discussed above in particular with respect to the expiry of timer T312.

The node may adjusts the at least one mobility parameter to increase robustness of mobility also based on this determination.

The node may also or alternatively determine from the information related to the mobility whether a handover command has been received by the user equipment. The node may also or alternatively determine when a measurement report has been triggered. The node may adjusts the at least one mobility parameter to increase robustness of mobility also based on this determination(s). Such concepts are discussed in further detail above.

In one example, a cell individual offset, CIO, may be increased or decreased by a larger step size in case no measurement report has been sent and/or CIO may be increased or decrease by a smaller step size in case a measurement report has been sent.

In an optional step S1006, the node receives information on a radio link monitoring, RLM, configuration. The RLM configuration may comprise information on at least one of a radio link failure timer such as a duration or setting of the radio link failure timer (e.g. timer T310) and a handover timer such as a duration or setting of a handover timer (e.g. timer T312). Information on RLM configuration is also an example of information related to the mobility of the user equipment.

In an optional step S1007, the node may adjusts at least one mobility parameter to increase robustness of mobility also based on a context of the user equipment. Such UE context may be in an RLF report or may be available or received in the node.

In an optional step S1008, the node adjusts at least one mobility parameter to increase robustness of mobility also based on a mobility state estimate, MSE, of the user equipment. The node may receive the MSE from the user equipment. Such utilizations of mobility state estimations are discussed in further detail above.

Typically, the adjustment is made on a per cell level. E.G. adjustment may be done in a serving cell, a target cell, a re-establishment cell and so on. Mobility parameters in such a cell may be adjusted for all user equipments or for a subset of user equipments in this cell.

The node may receive from the UE some or all of the received information. The information may be received in a direct or indirect manner. For example, some or all received information is received in a report such as a RLF report.

The at least one mobility parameter is at least one of: a cell individual offset, CIO; a handover threshold; a parameter indicative of a threshold signal strength of a target cell required for triggering a mobility event (such as reporting of power measurements to trigger a handover); a parameter indicative of a threshold signal strength of a serving cell required for triggering a mobility event (such as a handover command); a coefficient to be applied to a measurement utilized to trigger a mobility event (such as measurement reporting e.g. as part of a handover procedure or a handover command); a parameter indicative of a time period during which a trigger condition is to be met for actually triggering a mobility event; a handover timer (e.g. timer T312), a radio link failure timer (e.g. T310); a handover event offset (e.g. an offset to trigger a measurement report or an A3 offset); a Time To Trigger, TTT, (e.g. TTT a mobility event such as initiating a handover procedure); a handover event configuration; an indication to remove a cell from a carrier frequency; and a time period between receiving a measurement report and transmitting a handover request. Such parameters and exemplary utilizations are discussed in further detail above.

The order of the steps in FIG. 10 may be performed in any reasonable order. Typically the step S1003 of adjusting at least one mobility parameter is performed after relevant information is received or determined.

Figure 11:
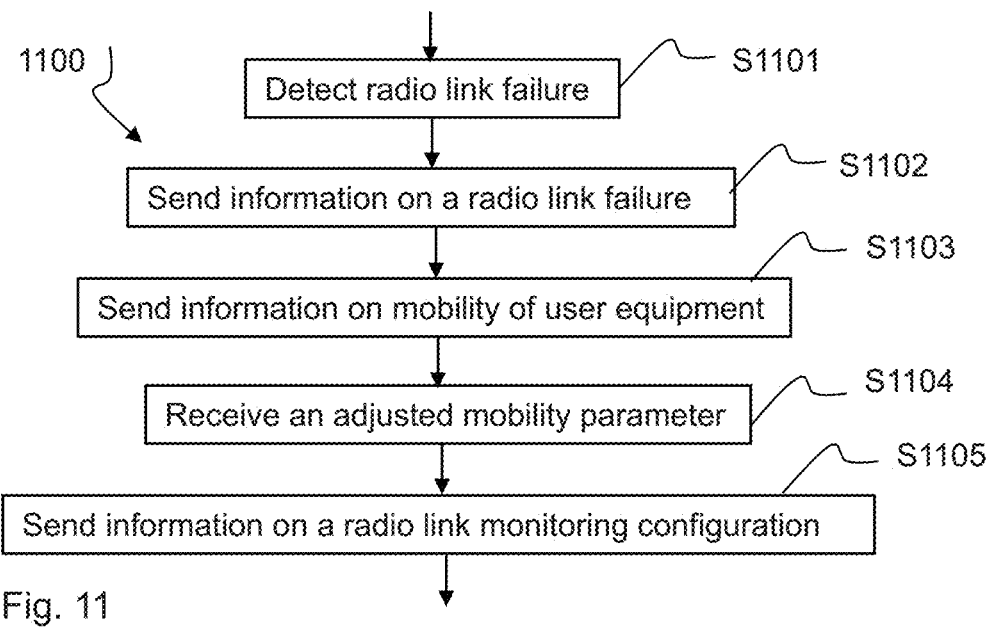
FIG. 11 shows a flowchart for illustrating a method according to an embodiment of the invention, which may be used for implementing a mobility support function in a user equipment.

FIG. 11 shows a flowchart for illustrating a method 1100 in a user equipment for supporting mobility in a cellular network, which may be used for implementing a mobility support function in a user equipment. If a processor based implementation of the user equipment is used, the steps of the method may be performed by one or more processors of the user equipment. For this purpose, the processor(s) may execute correspondingly configured program code. Further, at least some of the corresponding functionalities may be hardwired in the processor(s).

In a step S1101, the user equipment detects a failure of a radio link between the user equipment and the cellular network. The detection may be based on radio link monitoring, RLM, which is discussed in further detail above.

In a step S1102, the user equipment sends to a node of the cellular network, an information of a radio link failure of a radio link between the user equipment and the cellular network. The information may be sent in a direct or indirect manner. The information may be sent in an RLF report.

In a step S1103, the user equipment sends information related to a mobility of the user equipment to the node. The sending may be direct or indirect. Indirect sending may comprise that the information is first sent to at least one other node which forwards the information to the node. Direct sending may comprise sending on a direct link, e.g. without a further node between the UE and the node.

In an optional step S1104, the user equipment receives at least one adjusted mobility parameter from the node. The user equipment than typically adjusts the mobility parameter correspondingly. Examples of mobility parameters have been listed above. The receiving may be direct or indirect.

As stated above, the information related to the mobility of the user equipment comprises information of at least one of: a handover configuration; a handover timer such as a setting of the timer T312; a radio link failure timer such as a setting of the timer T310; whether the user equipment has send a measurement report, e.g. the measurement report send in a handover procedure; whether the network has received a measurement report from the user equipment; a failure cause, e.g. a reason that caused the failure or the expiry of the T312 timer; expiry of a handover timer e.g. timer T312; expiry of a radio link failure timer e.g. timer T310; whether a handover timer has expired; a list of cells fulfilling triggering conditions of a measurement report; a measurement event e.g. a measurement ID or the measurement event that has triggered a handover timer; a time period since a handover timer is triggered; a time period between sending a measurement report and occurrence of a radio link failure; a time period since a handover timer is running; and a time period since a link failure timer is running.

In an optional step S1105, the user equipment sends information on a radio link monitoring, RLM, configuration. This information may be send directly or indirectly to the node. As stated above, the RLM configuration may comprise information on at least one of a radio link failure timer such as a duration or setting of the radio link failure timer (e.g. timer T310) and a handover timer such as a duration or setting of a handover timer (e.g. timer T312). Information on RLM configuration is also an example of information related to the mobility of the user equipment.

The user equipment may send some or all of the information to be received by the node. This information may be send directly or indirectly to the node. Some or all received information is received by the node in a report such as a RLF report.

As stated above, the at least one adjusted mobility parameter is at least one of: a cell individual offset, CIO; a handover threshold; a parameter indicative of a threshold signal strength of a target cell required for triggering a mobility event (such as reporting of power measurements to trigger a handover); a parameter indicative of a threshold signal strength of a serving cell required for triggering a mobility event (such as a handover command); a coefficient to be applied to a measurement utilized to trigger a mobility event (such as measurement reporting e.g. as part of a handover procedure or a handover command); a parameter indicative of a time period during which a trigger condition is to be met for actually triggering a mobility event; a handover timer (e.g. timer T312), a radio link failure timer (e.g. T310); a handover event offset (e.g. an offset to trigger a measurement report or an A3 offset); a Time To Trigger, TTT, (e.g. TTT a mobility event such as initiating a handover procedure); a handover event configuration; an indication to remove a cell from a carrier frequency; and a time period between receiving a measurement report and transmitting a handover request.

It is to be understood that the methods of FIGS. 10 and 11 may be combined in a system which includes one or more nodes for a cellular network operating according to the method of FIG. 10 and one or more user equipment(s) operating according to the method of FIG. 11.

Figure 12:
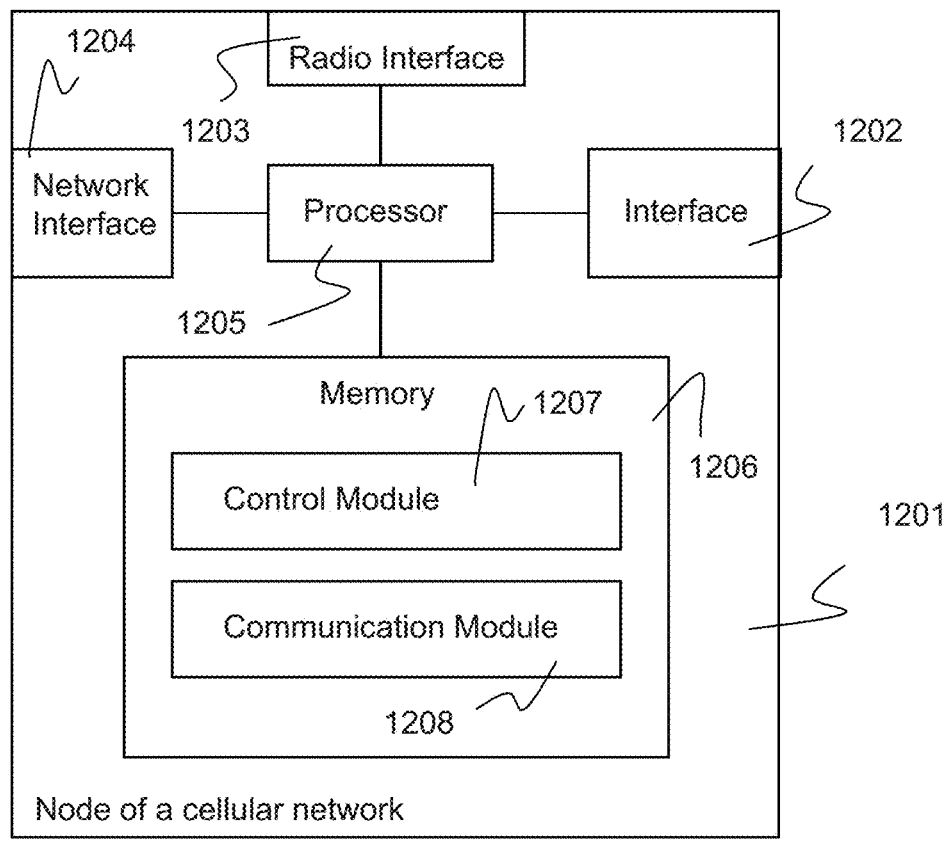
FIG. 12 schematically illustrates exemplary structures of a node for a cellular network according to an embodiment of the invention.

FIG. 12 schematically illustrates exemplary structures for implementing a node for a cellular network which operates in accordance with the above concepts. In the illustrated example, the node includes a first traffic interface 1203 for communication with one or more UEs and a second traffic interface 1204 for communication with other network nodes. If the node is implanted as an eNodeB, the first traffic interface 1203 may correspond to a radio interface. Further, the node includes a management (MGMT) interface 1202, which may be used for communication for management purposes. The management interface 1202 may for example be used for receiving or transmitting the above-mentioned information. Further the node includes a network interface 1204 e.g. for communicating to other network nodes, e.g. eNodeBs.

Further, the node includes one or more processor(s) 1205 coupled to the interfaces 1202, 1203, and 1204 and to a memory 1206 coupled to the processor(s) 1205. The memory 1206 may include a read-only memory (ROM), e.g., a flash ROM, a random access memory (RAM), e.g., a dynamic RAM (DRAM) or static RAM (SRAM), a mass storage, e.g., a hard disk or solid state disk, or the like. The memory 1206 includes suitably configured program code modules to be executed by the processor(s) 1205 so as to implement the above-described functionalities of the node, e.g., corresponding to the method steps of FIG. 10. More specifically, the program code modules in the memory 1206 may include a control module 1207 so as to implement the above-described functionalities of adjusting at least one mobility parameter. Further, the program code modules in the memory 1206 may include a communication module 1208 so as to implement the above-described functionalities of receiving information of a radio link failure and information related to mobility.

It is to be understood that the structures as illustrated in FIG. 12 are merely schematic and that the node may actually include further components which, for the sake of clarity, have not been illustrated, e.g., further interfaces or further processors. Also, it is to be understood that the memory 1206 may include further types of program code modules, which have not been illustrated, e.g., program code modules for implementing known functionalities of a node, such as an eNodeB, a NodeB, an RNC, a BSC, a network management node. In some implementations, also a computer program may be provided for implementing functionalities of a node, e.g., in the form of a physical medium storing the program code modules to be stored in the memory 1106 or by making such program code available for download or streaming.

FIG. 13 schematically illustrates exemplary structures for implementing a user equipment which operates in accordance with the above concepts. In the illustrated example, the user equipment 1301 includes a radio interface 1302 for performing data transmission to or from the cellular network. It is to be understood that for implementing receive (RX) functionalities the radio interface 1302 may include one or more RX modules 1304, and for implementing transmit (TX) functionalities the radio interface 1302 may include one or more TX modules 1303.

Further, the user equipment includes one or more processor(s) 1305 coupled to the radio interface 1302 and a memory 1306 coupled to the processor(s) 1305. The memory 1306 may include a Read-Only-Memory (ROM), e.g., a flash ROM, a Random Access Memory (RAM), e.g., a dynamic RAM (DRAM) or static RAM (SRAM), a mass storage, e.g., a hard disk or solid state disk, or the like. The memory 1306 includes suitably configured modules of program code to be executed by the processor(s) 1305 so as to implement the above-described functionalities. More specifically, the memory 1306 may include a control module 1308 so as to implement above-described functionalities such as detecting a radio link failure. Further, the program code modules in the memory 1305 may include a communication module 1309 so as to implement the above-described functionalities such as sending information of a radio link failure and information related to mobility of the user equipment.

It is to be understood that the structures as illustrated in FIG. 13 are merely schematic and that the user equipment may actually include further components which, for the sake of clarity, have not been illustrated, e.g., further interfaces, sensors, actuators, output devices, or additional processors. Also, it is to be understood that the memory 1306 may include further types of program code modules, which have not been illustrated. For example, the memory 1306 may include program code modules for implementing typical functionalities of a user equipment or program code modules of one or more applications to be executed by the processor(s) 1305. According to some implementations, also a computer program may be provided for implementing functionalities of the user equipment, e.g., in the form of a physical medium storing the program code modules to be stored in the memory 1306 (such as modules 1308 and 1309) or by making such program code available for download or streaming.

Modifications and other embodiments of all disclosed embodiments will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

Certain aspects and further support of the invention are presented and further discussed in the following: In contribution R2-141023, entitled "Introduction of T312", a new RLF detection timer was agreed to be added to the RRC protocol specification TS36.331, such detection timer is named T312.

FIG. 14 shows a definition of a T312 timer. The timer T312 may be started upon triggering a measurement report for a measurement identity for which T312 has been configured, while T310 is running. The timer T312 may be stopped upon receiving N311 consecutive in-sync indications from lower layers, upon triggering the handover procedure, upon initiating the connection re-establishment procedure, and upon the expiry of T310. At expiry of the Timer T312, it is foreseen to go to RRC_IDLE, if security is not activated, else it is foreseen to initiate the connection re-establishment procedure.

Namely, is a timer starting at measurement report triggering by the UE, while T310 is still running, i.e. T312 is only started if problems over the physical layer are identified and have triggered T310.

Here it is explained why it would be beneficial to report a T312 expiration triggered RLF in the RLF Report, as part of other existing RLF cause values. At first, the importance of knowing T312 RLF events in RAN is further discussed.

As part of the HetNet (Heterogeneous Network) Mobility Enhancements Work Item (WI) concluded in 3GPP RAN2, timer T312 has been agreed to trigger fast RLF events (see R2-141023). Timer T312 triggers RLF while T310 is running, i.e. when physical layer problems have already been detected by the UE.

A typical configuration of T312 would be to make this timer expire earlier than T310, in a way that RLFs following already triggered measurement reports (i.e. RLFs likely imputable to suboptimal mobility settings) can be declared sooner and earlier re-establishments can be triggered.

FIG. 3 illustrates a Handover-RLF timer T312 explains how timer T312 could function.

In the current RLF Report (e.g. according to TS 36.331 V12.0.0) signalled by the UE as part of the MRO solution, a number of RLF cause values are already included. The reason for inclusion of such causes is to allow the RAN to have a better understanding of the root cause of failure and to be able to apply the right adjustments depending on the declared cause. The RLF cause values currently reportable in the RLF Report are listed in FIG. 9C (see TS36.331 V12.0.0).

By including the T312 Expiration cause to the current list of RLF cause values, or alternatively by adding an additional IE flagging such event, it would be possible to let the RAN know whether the failure occurred once a measurement report was triggered by the UE. Namely, the RAN would be able to know whether mobility event conditions (e.g. A3, A2 events) were encountered by the UE before the RLF was declared.

The latter information is very important because it enables to better distinguish failures due to e.g. fast fading signals, coverage wholes, shadow area conditions or highly suboptimal mobility parameters settings from failures due to badly configured mobility parameters in need of relatively small tuning. In Heterogeneous Network scenarios the latter is very important, as explained in FIG. 3.

Figure 15:
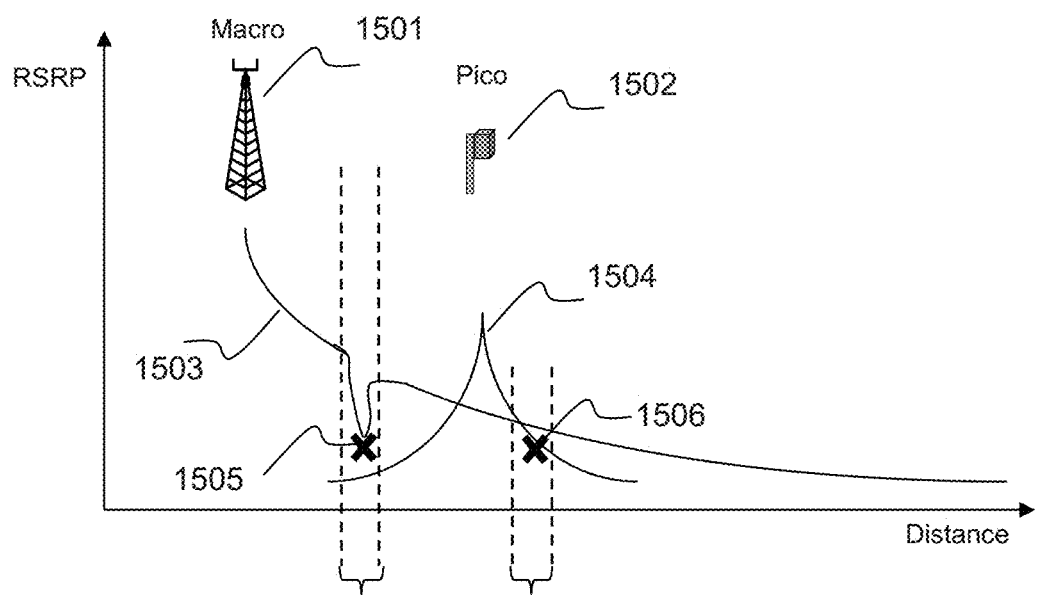
FIG. 15 shows received signal powers and handover regions in an exemplary cellular network and gives examples of handling of radio link failures according to embodiments of the invention.

FIG. 15 shows received signal powers (RSRP) as a function of distance in an exemplary cellular network scenario. The cellular network scenario comprises a macro base station 1501 and a pico base station 1502. Curves 1503 and 1504 show RSRP a UE receives from macro base station 1501 and pico base station 1502 respectively as a function of distance from the respect node. A RLF due to a macro base station signal drop is indicated in a situation 1505. A failure in a handover region for a handover between pico base station 1501 and macro base station 1502 or a failure due to suboptimal mobility parameters is indicated in situation 1506.

FIG. 15 gives examples of RLFs where knowledge of Measurement Report Triggering may be helpful according to an embodiment of the invention. In FIG. 15 three possible failures are shown. The first is a failure due to coverage issues, i.e. T312 triggered RLF would not occur because neighbor cell signal is not such to trigger a handover report.

In this case the root cause of failure is unlikely to be addressed by modification of mobility parameters.

The second failure is a case where the UE is in the HO region between macro and pico. The latter would be deductible by the presence of the T312 expiration cause. In this case the fact that a measurement report was sent by the UE is indicative of the possibility to address the failure by fine tuning mobility parameters settings.

The third failure is a case where the UE is in the HO region between macro and pico but a measurement report was not triggered by the UE. The latter would be deductible by the measurements reported in the RLF Report. In this case the fact that a measurement report was not sent by the UE is indicative of a rather bad configuration of mobility events, which may need to be adjusted with large delta changes.

As further explained in the following, by allowing inclusion of T312—Expiration causes in the RLF Report not only it would be possible to know that a measurement report was triggered by the UE, but provided that the UE context or part of such information is available at the source eNB the following can also be known:

Whether the Measurement Report was received by the eNB even during T310 time windows: in fact, a frequent condition is that the Measurement Report is sent by the UE but not received by the eNB. It is useful to know that the measurement report can be received while T310 is running, i.e. even in DL problematic conditions By retrieving the duration of the T312 timer set for the failed UE and by checking the reported measurements in RLF Report, it is possible to have an estimate of how much measurement report triggering should be anticipated: if T312 is relatively short and source cell signal not too low, a relatively small step in anticipating the HO trigger point is needed to allow measurement report to be received by the eNB and consequently to allow successful HO command reception at the UE.

Possible enhancements allowed by T312-Expiration reporting are considered here. As discussed with the discussion related to the Importance of knowing T312 RLF events in RAN, new information on the failure event is deductible from knowing that the RLF is caused by an expiration of T312.

Here is a list of parameters that can be better tuned by reporting T312-Expiration caused RLF events:

Knowledge of T312 expiration allows to adjust Time To Trigger (TTT): Depending on T312 duration and on whether a measurement report was received by the source eNB, TTT could be optimised (e.g. reduced) to allow faster triggering of mobility events Knowledge of T312 expiration allows better tuning of CIO: if RLF is due to T312 expiration it means that the HO trigger point needs to be anticipated of a relatively small amount, to allow successful delivery of the HO Command Knowledge of T312 expiration allows for better tuning of time between measurement report reception and HO Command transmission: if RLF is due to T312 expiration and if measurement report is received at source eNB, an RLF might be due to delayed transmission of HO Command.

Knowledge of T312 expiration allows to better detect cases of coverage holes and fast fading effects: the RLF Report already contains neighbour cells measurements indicating neighbour cells signal strength. This sometimes is not enough to understand situations of coverage holes or fast fading signals. Knowledge of whether a measurement report was triggered before RLF provides information on whether neighbour cells were potential HO candidates or whether the UE is in a poor coverage zone with no good HO candidate cells.

Knowledge of T312 expiration allows to gain a better understanding on the measurements included in the RLF Report. These measurements in fact would be very recent, as the Measurement Report is sent while T310 is already running.

Reporting of RLF events information where the measurement report has been sent by the UE can help adjusting the duration of T312. This timer in fact has the purpose of allowing for faster re-establishment triggering and can be tuned to accelerate RLF declaration in cases where it is deduced (e.g. by measurements reported in RLF Report) that a sudden drop in serving cell signal and good enough neighbour cell signal is detected.

In this further discussion of the invention advantages of reporting T312 Expiration as part of the RLF Report were explained in the context of Mobility Robustness Optimization. It has been outlined that it would be beneficial to add such new RLF cause to the RLF Report to complete the reported RLF cause value range already present. It is proposed to report T312 expiration in the RLF Report. It is further proposed to include an T312 Expiration cause in the RLF Report.

Abbreviations

ACK Acknowledgement
ARFCN Absolute Radio Frequency Channel Number
CGI Cell Global Identifier
CIO Cell Individual Offset
eNB evolved Node B
FDD Frequency Division Duplex
HO Handover
HSPA High Speed Packet Access
LTE Long Term Evolution
MRO Mobility Robustness Optimization
MSE Mobility State Estimation
PCI Physical Cell Identity
PHY Physical layer
PLMN Public Land Mobile Network
RACH Random Access Channel
RAN Radio Access Network
RAT Radio Access Technology
RLC Radio Link Control
RLF Radio Link Failure
RLM Radio Link Monitoring
RNTI Radio Network Temporary Identity
RRC Radio Resource Control
RSRP Reference Signal Received Power
RSRQ Reference Signal Received Quality
TDD Time Division Duplex(ing)
TTT Time To Trigger
UTRAN Universal Terrestrial Radio Access Network
X2AP X2 Application Protocol

What is claimed is:

1. A method, performed by a user equipment, the method comprising:
 starting a first timer in response to detecting a physical layer problem with a radio link between the user equipment and a node of a cellular network;
 responsive to detecting a handover measurement event, starting a second timer and sending a measurement report to the node, wherein the starting of the first and second timers causes the first and second timers to simultaneously elapse;

responsive to one of the simultaneously elapsing timers expiring, sending a radio link failure report to the node indicating which of the simultaneously elapsing timers expired.

2. The method of claim 1, further comprising, responsive to the one of the simultaneously elapsing timers expiring, sending information to the node indicating a handover configuration.

3. The method of claim 1, further comprising, responsive to the one of the simultaneously elapsing timers expiring, sending information to the node regarding the other of the simultaneously elapsing timers.

4. The method of claim 1, further comprising, responsive to the one of the simultaneously elapsing timers expiring, sending information to the node indicating that the user equipment sent the measurement report.

5. The method of claim 1, further comprising, responsive to the one of the simultaneously elapsing timers expiring, sending information to the node indicating a list of cells fulfilling measurement report triggering conditions.

6. The method of claim 1, further comprising, responsive to the one of the simultaneously elapsing timers expiring, sending information to the node indicating the detected handover measurement event.

7. The method of claim 1, wherein the simultaneously elapsing timers comprise a T310 timer and a T312 timer.

8. The method of claim 1, further comprising:
receiving, from the node, a message in response to the radio link failure report; and
adjusting one or more mobility parameters of the user equipment based on the message.

9. The method of claim 8, wherein adjusting the one or more mobility parameters comprises adjusting a value of the first timer and/or a value of the second timer.

10. The method of claim 8, wherein adjusting the one or more mobility parameters comprises adjusting a cell individual offset setting.

11. A user equipment comprising:
interface circuitry; and
processing circuitry communicatively coupled to the interface circuitry and configured to:
start a first timer in response to detecting a physical layer problem with a radio link between the user equipment and a node of a cellular network;
responsive to detecting a handover measurement event, start a second timer and send a measurement report to the node via the interface circuitry, wherein the starting of the first and second timers causes the first and second timers to simultaneously elapse;
responsive to one of the simultaneously elapsing timers expiring, send a radio link failure report, to the node via the interface circuitry, indicating which of the simultaneously elapsing timers expired.

12. The user equipment of claim 11, wherein the processing circuitry is further configured to, responsive to the one of the simultaneously elapsing timers expiring, send information to the node indicating a handover configuration.

13. The user equipment of claim 11, wherein the processing circuitry is further configured to, responsive to the one of the simultaneously elapsing timers expiring, send information to the node regarding the other of the simultaneously elapsing timers.

14. The user equipment of claim 11, wherein the processing circuitry is further configured to, responsive to the one of the simultaneously elapsing timers expiring, send information to the node indicating that the user equipment sent the measurement report.

15. The user equipment of claim 11, wherein the processing circuitry is further configured to, responsive to the one of the simultaneously elapsing timers expiring, send information to the node indicating a list of cells fulfilling measurement report triggering conditions.

16. The user equipment of claim 11, wherein the processing circuitry is further configured to, responsive to the one of the simultaneously elapsing timers expiring, send information to the node indicating the detected handover measurement event.

17. The user equipment of claim 11, wherein the simultaneously elapsing timers comprise a T310 timer and a T312 timer.

18. The user equipment of claim 11, wherein the processing circuitry is further configured to:
receive, from the node via the interface circuitry, a message in response to the radio link failure report; and
adjust one or more mobility parameters of the user equipment based on the message.

19. The user equipment of claim 18, wherein to adjust the one or more mobility parameters, the processing circuitry is configured to adjust a value of the first timer and/or a value of the second timer.

20. The user equipment of claim 18, wherein to adjust the one or more mobility parameters, the processing circuitry is configured to adjust a cell individual offset setting.

21. A non-transitory computer readable medium storing a computer program product for controlling a programmable user equipment in a cellular communication network, the computer program product comprising software instructions that, when executed by processing circuitry of the programmable user equipment, cause the programmable user equipment to:
start a first timer in response to detecting a physical layer problem with a radio link between the user equipment and a node of a cellular network;
responsive to detecting a handover measurement event, start a second timer and send a measurement report to the node, wherein the starting of the first and second timers causes the first and second timers to simultaneously elapse;
responsive to one of the simultaneously elapsing timers expiring, send a radio link failure report, to the node, indicating which of the simultaneously elapsing timers expired.

* * * * *

UNITED STATES PATENT AND TRADEMARK OFFICE
CERTIFICATE OF CORRECTION

PATENT NO. : 11,005,704 B2
APPLICATION NO. : 16/704221
DATED : May 11, 2021
INVENTOR(S) : Dudda et al.

It is certified that error appears in the above-identified patent and that said Letters Patent is hereby corrected as shown below:

In the Specification

Column 1, Line 7, delete "2015," and insert -- 2015, now U.S. Pat. No. 10,530,639, --, therefor.

Column 2, Line 4, delete "Special" and insert -- Spécial --, therefor.

Column 7, Line 3, delete ""sizes":" and insert -- "sizes". --, therefor.

Column 7, Lines 32-33, delete "received signal powers (RSRP)" and insert -- Reference Signal Received Power (RSRP) --, therefor.

Column 8, Line 30, delete "measld" and insert -- measId --, therefor.

Column 8, Line 37, delete "Oms" and insert -- 0ms --, therefor.

Column 9, Line 41, delete "402" and insert -- 402. --, therefor.

Column 10, Line 49, delete "VARRLF-Report" and insert -- VarRLF-Report --, therefor.

Columns 10 & 11, Lines 56-67 & 1-11, delete "Optimization, MRO,---- elements by network node." and insert the same at Line 55 in Column 10 as a continuation paragraph.

Column 11, Line 15, delete "(NE)," and insert -- (NEs), --, therefor.

Column 11, Line 26, delete "execute" and insert -- executed --, therefor.

Column 12, Line 4, delete "are" and insert -- is --, therefor.

Column 12, Line 7, delete "need" and insert -- needs --, therefor.

Signed and Sealed this
Twenty-fourth Day of May, 2022

Katherine Kelly Vidal
*Director of the United States Patent and Trademark Office*

Column 12, Line 22, delete "send" and insert -- sent --, therefor.

Column 12, Line 34, delete "A important" and insert -- An important --, therefor.

Column 13, Line 47, delete "(i.e." and insert -- i.e. --, therefor.

Column 16, Line 20, delete "bases" and insert -- basis --, therefor.

Column 17, Line 4, delete ""to" and insert -- 'too --, therefor.

Column 18, Line 47, delete "T312)," and insert -- T312); --, therefor.

Column 19, Line 22, delete "than" and insert -- then --, therefor.

Column 19, Line 46, delete "send" and insert -- sent --, therefor.

Column 19, Line 56, delete "send" and insert -- sent --, therefor.

Column 20, Line 5, delete "T312)," and insert -- T312); --, therefor.

Column 22, Line 50, delete "received signal powers (RSRP)" and insert -- Reference Signal Received Power (RSRP) --, therefor.

Column 22, Lines 58-59, delete "pico base station 1501 and macro base station 1502" and insert -- pico base station 1502 and macro base station 1501 --, therefor.

In Column 24, Line 24, delete "an T312" and insert -- a T312 --, therefor.